(12) United States Patent
Yamada

(10) Patent No.: US 9,838,553 B2
(45) Date of Patent: Dec. 5, 2017

(54) IMAGE READER, AND METHOD AND COMPUTER-READABLE MEDIUM FOR THE SAME

(71) Applicant: BROTHER KOGYO KABUSHIKI KAISHA, Nagoya-shi, Aichi-ken (JP)

(72) Inventor: Koji Yamada, Konan (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/395,148

(22) Filed: Dec. 30, 2016

(65) Prior Publication Data

US 2017/0111527 A1    Apr. 20, 2017

Related U.S. Application Data

(63) Continuation of application No. 14/837,098, filed on Aug. 27, 2015, now Pat. No. 9,565,329.

(30) Foreign Application Priority Data

Aug. 29, 2014 (JP) ................................. 2014-175069

(51) Int. Cl.
*H04N 1/04* (2006.01)
*H04N 1/00* (2006.01)
(Continued)

(52) U.S. Cl.
CPC ..... *H04N 1/00551* (2013.01); *H04N 1/00708* (2013.01); *H04N 1/00737* (2013.01);
(Continued)

(58) Field of Classification Search
CPC ........... H04N 1/00779; H04N 1/00551; H04N 2201/0081
(Continued)

(56) References Cited

U.S. PATENT DOCUMENTS

| 5,900,950 A * | 5/1999 | Hsu | H04N 1/00 358/474 |
| 2006/0250661 A1 * | 11/2006 | Susaki | H04N 1/4076 358/461 |
| 2010/0296135 A1 | 11/2010 | Tanaka | |

FOREIGN PATENT DOCUMENTS

| JP | 9-102851 A | 4/1997 |
| JP | 2005-020049 A | 1/2005 |

(Continued)

*Primary Examiner* — Houshang Safaipour
(74) *Attorney, Agent, or Firm* — Merchant & Gould P.C.

(57) ABSTRACT

An image reader including a document table having a reference point, a first region of a sheet having a predetermined size when a vertex of the sheet is positioned on the reference point, and a second region, a changing mechanism changing a reading position in a sub scanning direction, and a controller configured to control the changing mechanism to change the reading position to a first position such that a distance in the sub scanning direction between the reference point and the first position corresponds to a length of the predetermined sheet size in the sub scanning direction, acquire specific digital data of the second region through image reading in the first position with a light source turned off, compare a particular value of the specific digital data with a criterion value within the second region, and determine a state of a document cover based on the comparison.

3 Claims, 19 Drawing Sheets

(51) Int. Cl.
*H04N 1/10* (2006.01)
*H04N 1/047* (2006.01)

(52) U.S. Cl.
CPC ....... *H04N 1/00753* (2013.01); *H04N 1/0473* (2013.01); *H04N 1/1061* (2013.01); *H04N 2201/0081* (2013.01)

(58) Field of Classification Search
USPC ................................ 358/488, 474, 498, 497
See application file for complete search history.

(56) References Cited

FOREIGN PATENT DOCUMENTS

| | | |
|---|---|---|
| JP | 2006-154586 A | 6/2006 |
| JP | 2010-199806 A | 9/2010 |

\* cited by examiner

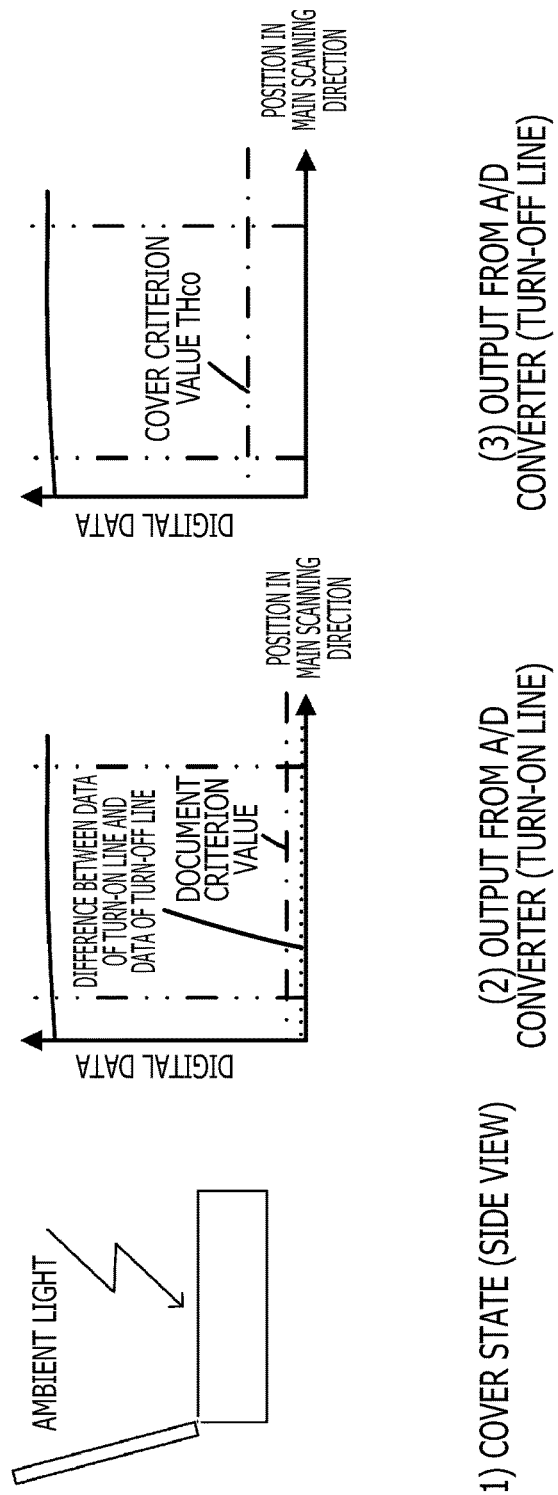

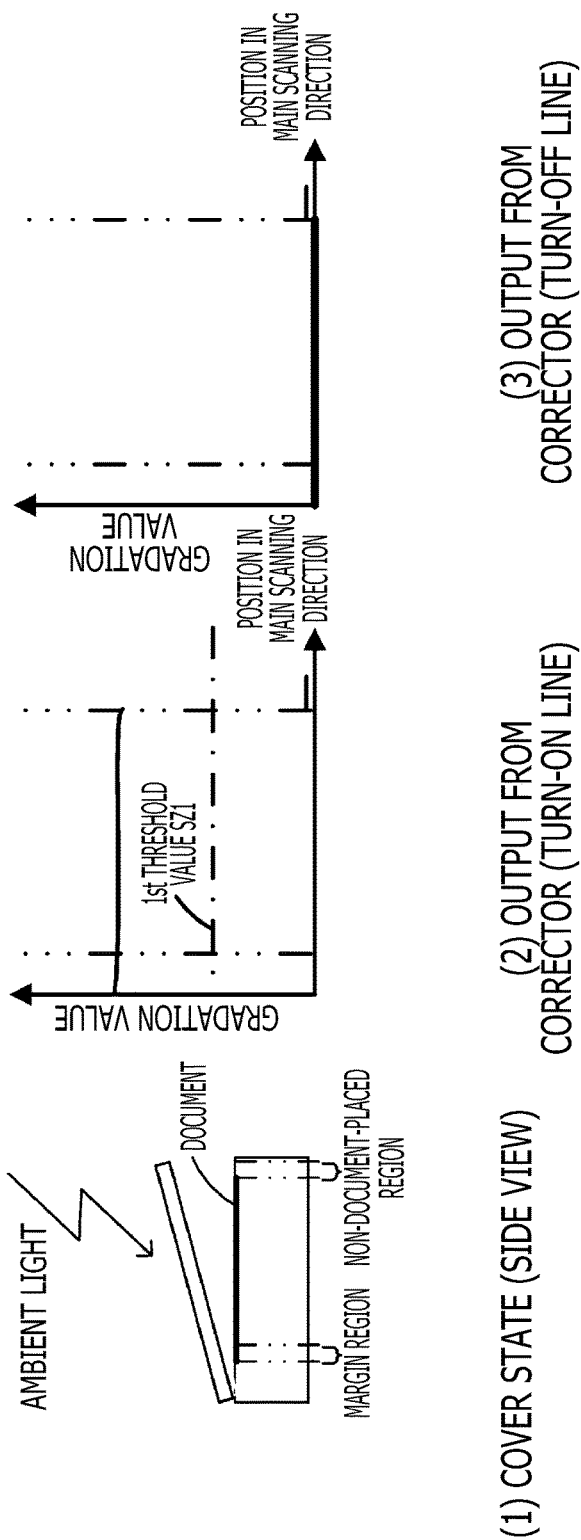

IMAGE READER, AND METHOD AND COMPUTER-READABLE MEDIUM FOR THE SAME

CROSS-REFERENCE TO RELATED APPLICATION

This application is a Continuation of U.S. application Ser. No. 14/837,098 filed on Aug. 27, 2015, which claims priority under 35 U.S.C. §119 from Japanese Patent Application No. 2014-175069 filed on Aug. 29, 2014. The entire subject matters of these applications are incorporated herein by reference.

BACKGROUND

Technical Field

The following description relates to one or more aspects of an image reader.

Related Art

In reading a document placed on a document table of an image reader, it is required to determine whether a document cover is in a fully-closed state. An image reader has been known that is configured to detect an open/closed state of a document cover using a cover state sensor, and perform document reading with a light source turned on.

SUMMARY

However, as the known image reader detects the open/closed state of the document cover using the cover state sensor, the image reader needs a large apparatus body. Further, the image reader needs a complicated configuration for detecting an output signal from the cover state sensor.

Aspects of the present disclosure are advantageous to provide one or more improved techniques, for an image reader, which make it possible to detect an open/closed state of a document cover even without a cover state sensor.

According to aspects of the present disclosure, an image reader is provided, which includes a document table configured to support a document placed thereon, the document table having a reference point on which a vertex of the document is positioned, a first region defining an area of a predetermined sheet size with respect to the reference point, and a second region different from the first region, a document cover movable between an open state and a closed state, the document cover being configured to cover an upper surface of the document table when the document cover is in the closed state, a reading unit including a light source configured to emit light toward the document placed on the document table, the reading unit being configured to perform image reading on a line-by-line basis along a main scanning direction, and output analog data as read data, a converter configured to convert the analog data output from the reading unit into digital data, a changing mechanism configured to change a reading position where image reading is performed, in a sub scanning direction perpendicular to the main scanning direction, and a controller configured to control the changing mechanism to change the reading position to a first position, the first position being such a position that a distance in the sub scanning direction between the reference point and the first position corresponds to a length of the predetermined sheet size in the sub scanning direction, acquire specific digital data of the second region through image reading in the first position with the light source turned off, compare a particular value of the specific digital data with a predetermined criterion value within the second region, and determine an open/closed state of the document cover, based on the comparison of the particular value of the specific digital data with the predetermined criterion value within the second region.

According to aspects of the present disclosure, further provided is a method adapted to be implemented on a processor coupled with an image reader including a document table configured to support a document placed thereon, the document table having a reference point on which a vertex of the document is positioned, a first region defining an area of a predetermined sheet size with respect to the reference point, and a second region different from the first region, a document cover movable between an open state and a closed state, the document cover being configured to cover an upper surface of the document table when the document cover is in the closed state, a reading unit including a light source configured to emit light toward the document placed on the document table, the reading unit being configured to perform image reading on a line-by-line basis along a main scanning direction, and output analog data as read data, a converter configured to convert the analog data output from the reading unit into digital data, and a changing mechanism configured to change a reading position where image reading is performed, in a sub scanning direction perpendicular to the main scanning direction, the method including causing the changing mechanism to change the reading position to a first position, the first position being such a position that a distance in the sub scanning direction between the reference point and the first position corresponds to a length of the predetermined sheet size in the sub scanning direction, acquiring specific digital data of the second region through image reading in the first position with the light source turned off, comparing a particular value of the specific digital data with a predetermined criterion value within the second region, and determining an open/closed state of the document cover, based on the comparison of the particular value of the specific digital data with the predetermined criterion value within the second region.

According to aspects of the present disclosure, further provided is a non-transitory computer-readable medium storing computer-readable instructions that are executable by a processor coupled with an image reader including a document table configured to support a document placed thereon, the document table having a reference point on which a vertex of the document is positioned, a first region defining an area of a predetermined sheet size with respect to the reference point, and a second region different from the first region, a document cover movable between an open state and a closed state, the document cover being configured to cover an upper surface of the document table when the document cover is in the closed state, a reading unit including a light source configured to emit light toward the document placed on the document table, the reading unit being configured to perform image reading on a line-by-line basis along a main scanning direction, and output analog data as read data, a converter configured to convert the analog data output from the reading unit into digital data, and a changing mechanism configured to change a reading position where image reading is performed, in a sub scanning direction perpendicular to the main scanning direction, the instructions being configured to, when executed by the processor, cause the processor to control the changing mechanism to change the reading position to a first position, the first position being such a position that a distance in the sub scanning direction between the reference point and the first position corresponds to a length of the predetermined sheet size in the sub scanning direction, acquire specific digital data of the second region through image reading in the first position with the light source turned off, compare a particular value of the specific digital data with a predetermined criterion value within the second region, and determine an open/closed state of the document cover, based on the comparison of the particular value of the specific digital data with the predetermined criterion value within the second region.

BRIEF DESCRIPTION OF THE ACCOMPANYING DRAWINGS

FIGS. 7A to 7E show relationships between a position in a main scanning direction and digital data in respective states of a document cover, in the illustrative embodiment according to one or more aspects of the present disclosure.

FIGS. 8A to 8E show relationships between the position in the main scanning direction and a gradation value in respective states of the document cover, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

[Configuration of Image Reader]

Figure 1A:
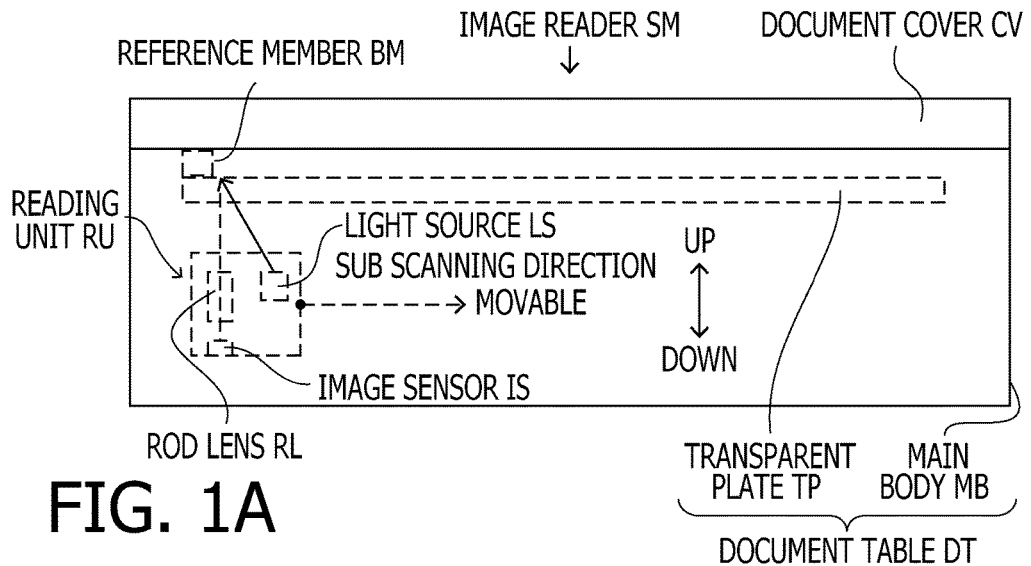
FIG. 1A is a front view schematically showing an internal configuration of an image reader in an illustrative embodiment according to one or more aspects of the present disclosure.

FIG. 1A is a front view of an image reader SM in an illustrative embodiment according to aspects of the present disclosure. The image reader SM includes a document table DT and a document cover CV. The document table DT includes a main body MD and a transparent plate TP. The main body MB is a housing configured to accommodate various members (such as the transparent plate TP and a reading unit RU). The transparent plate TP is disposed in and fixedly attached to the main body MB. The transparent plate TP is configured to support a document placed thereon. The document cover CV is disposed above the main body MB. The document cover CV is configured to be open and closed relative to the main body MB. Specifically, the document cover CV is openable from a front side of the main body MD by rotating around a rotational axis disposed at a rear side of the main body MB (i.e., at a far side in a direction perpendicular to a flat surface on which FIG. 1A is drawn). Namely, the document cover CV has the rotational axis thereof disposed at a side of a below-mentioned margin region MR, and is openable from a side of a below-mentioned non-document-placed region NDR. A downward-facing surface (i.e., a surface facing towards the transparent plate TP) of the document cover CV is colored white.

The image reader SM further includes the reading unit RU. The reading unit RU is disposed below the transparent plate TP, inside the main body MB. The reading unit RU is movable along a sub scanning direction (i.e., a left-to-right direction in FIG. 1A) relative to the main body MB. The reading unit RU is configured to read an image of the document placed on the transparent plate TP. The reading unit RU includes a contact image sensor (hereinafter referred to as a "CIS"). More specifically, the reading unit RU includes a light source LS, a rod lens RL, and an image sensor IS. The light source LS is configured to emit light towards the transparent plate TP. The rod lens RL is configured to receive reflected light of the light emitted by the light source LS. The image sensor IS is configured to receive the light transmitted through the rod lens RL. More specifically, the image sensor IS includes a plurality of optical elements arranged along a main scanning direction (i.e., a direction perpendicular to the flat surface on which FIG. 1A is drawn). Namely, the image sensor IS is a line sensor configured to perform image reading on a line-by-line basis along the main scanning direction in which the plurality of optical elements are arranged. Hereinafter, in the sub scanning direction, a position where the image sensor IS exists may be referred to as a "reading position."

Figure 1B:
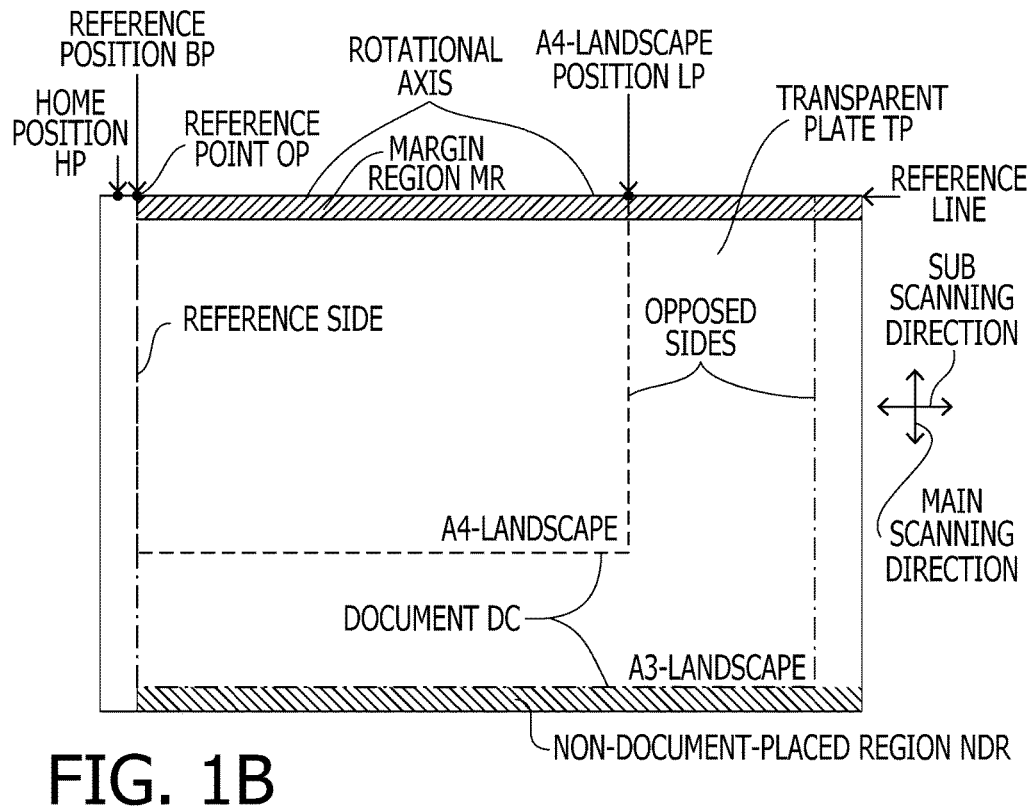
FIG. 1B is a plane view of a transparent plate of the image reader in the illustrative embodiment according to one or more aspects of the present disclosure.

FIG. 1B is a plane view of the transparent plate TP. The transparent plate TP is formed in a rectangular shape having a long side extending along the sub scanning direction and a short side extending along the main scanning direction. At an end portion (i.e., a left end portion in FIG. 1B) of an exposed surface of the transparent plate TP that is exposed towards the document cover CV, a reference point OP is defined. The reference point OP is a point on which a vertex of a document DC is to be positioned. On the transparent plate TP, the document DC is placed. An A4-size document DC placed landscape (with a longitudinal direction thereof along the sub scanning direction) is indicated by a dashed line in FIG. 1B, and may be referred to as an "A4-landscape document DC." The "landscape-placed state" is a state where the document DC is placed on the transparent plate TP in such a manner that long sides of the document DC are along long sides of the exposed surface of the transparent plate TP and that short sides of the document DC are along short sides of the exposed surface of the transparent plate TP. A short side of the document DC that includes the reference point OP is defined as a reference side. A short side of the document DC that is opposed to the reference side is defined as an opposed side. In the following description, a position of the reference side in the sub scanning direction may be referred to as a "reference position BP." A position of the opposed side of the A4-landscape document DC in the sub direction may be referred to as an "A4-landscape position LP." In the sub scanning direction, a long side, including the reference point OP, of the exposed surface of the transparent plate TP may be referred to as a "reference line." It is noted that the transparent plate TP has such a size that an A3-size document DC is allowed to be placed landscape as a maximum-size document. The A3-size document DC placed landscape (with a longitudinal direction thereof along the sub scanning direction) is indicated by an alternate long and short dash line in FIG. 1B, and may be referred to as an "A3-landscape document DC."

In the main scanning direction, a margin region MR (hatched with a pattern of lines inclined upward to the right in FIG. 1B) is defined as a part of a document-placed region (where a document is allowed to be placed) within 3 mm from the reference line. Further, in the main scanning direction, a non-document-placed region NDR (hatched with a pattern of lines inclined downward to the right in FIG. 1B) is defined as a region from the long side, which does not include the reference point OP and is opposed to the reference line, of the exposed surface of the transparent plate TP to a region where the A3-landscape document DC is allowed to be placed.

The image reader SM further includes a reference member BM fixedly attached to an upper surface of the transparent plate TP. The reference member BM is disposed at an end portion (i.e., a left end portion in FIG. 1B) of the transparent plate TP in the sub scanning direction. The reference member BM is a white member extending along the main scanning direction. The reference member BM is used to acquire below-mentioned white data. Hereinafter, in the sub scanning direction, a position where the reference member BM is disposed may be referred to as a "home position HP."

[Control Configuration of Image Reader]

Figure 2:
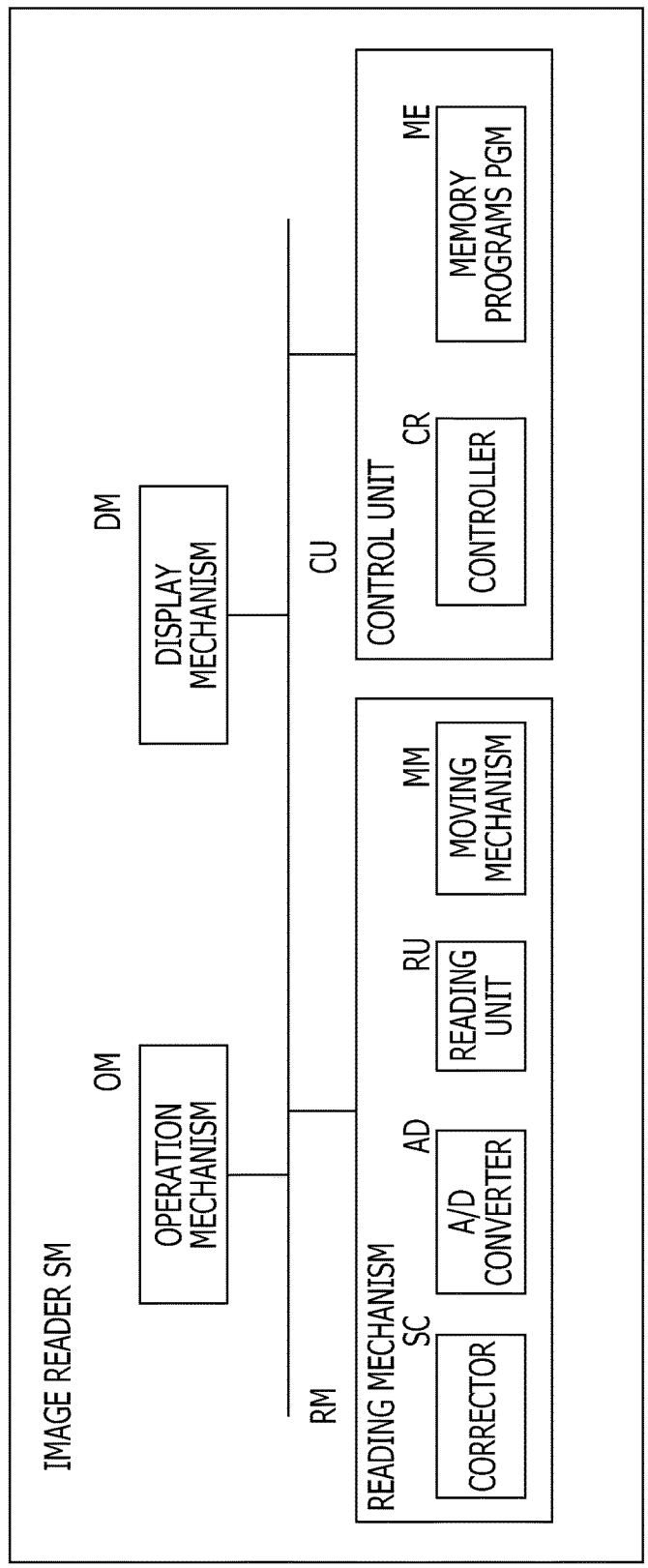
FIG. 2 is a block diagram schematically showing a configuration of a control system of the image reader in the illustrative embodiment according to one or more aspects of the present disclosure.

FIG. 2 schematically shows a control configuration of the image reader SM. The image reader SM further includes an operation mechanism OM, a display mechanism DM, a reading mechanism RM, and a control unit CU. The operation mechanism OM includes a plurality of keys. A user is allowed to operate the operation mechanism OM and input instructions to the image reader SM. The display mechanism DM includes a display configured to display various kinds of information. The control unit CU includes a controller CR and a memory ME. The controller CR includes a processor configured to perform various processes (such as processes shown in FIGS. 3 to 6) in accordance with programs PGM stored in the memory ME.

The reading mechanism RM includes a reading unit RU, a moving mechanism MM, an A/D converter AD, and a corrector SC. The moving mechanism MM is configured to move the reading unit RU along the sub scanning direction. The A/D converter AD is configured to convert analog data output from the reading unit RU, into digital data. The corrector SC is configured to convert, into gradation values, the digital data generated through the conversion by the A/D convertor AD, through shading correction using below-mentioned white data and black data. It is noted that the digital data generated through the conversion by the A/D convertor AD is output to the memory ME and the corrector SC. The digital data output to the memory ME is stored into the memory ME. The gradation values generated through the shading correction by the corrector SC are output to and stored into the memory ME.

[Power-on Process as Main Process]

Figure 3:
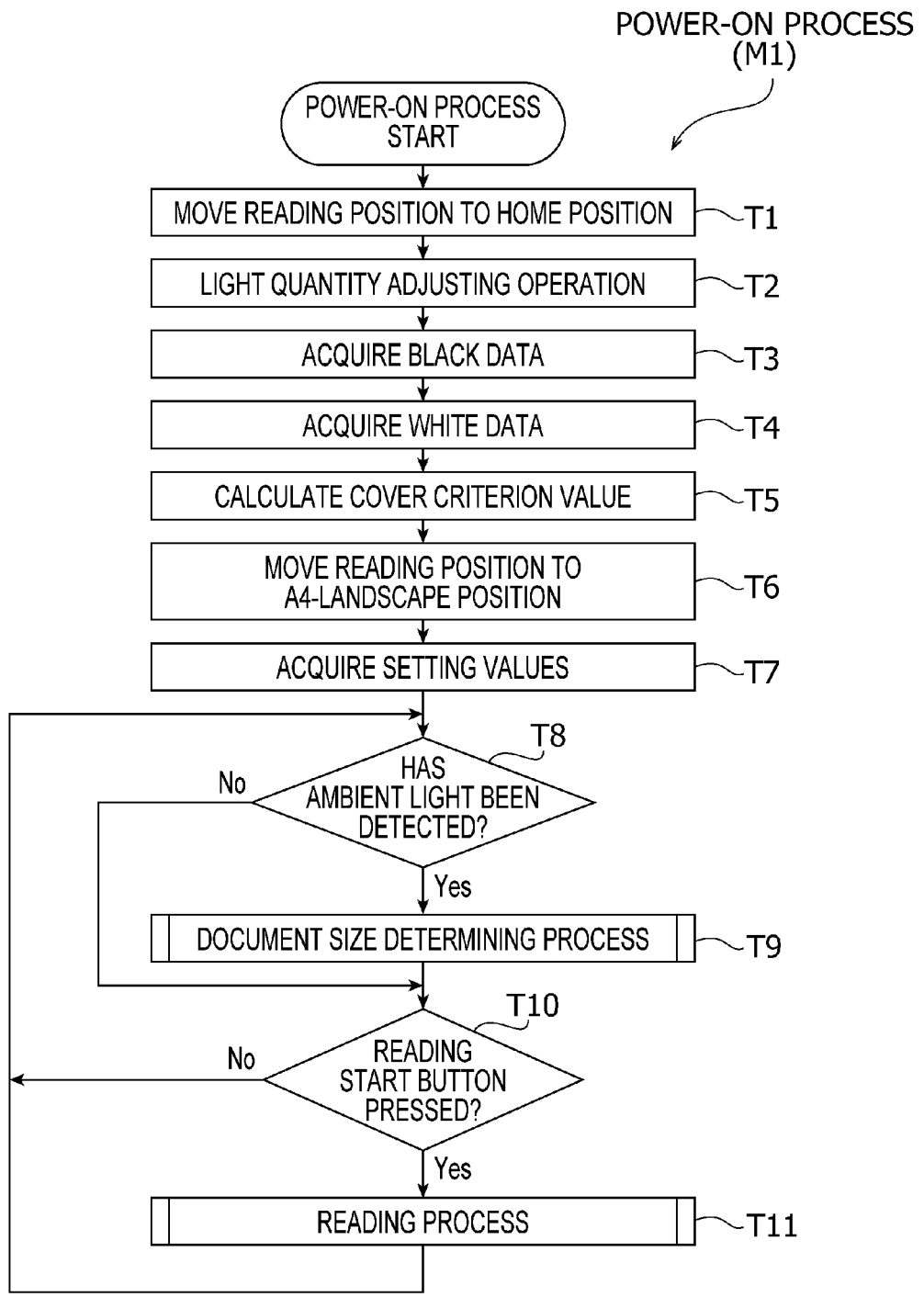
FIG. 3 is a flowchart showing a procedure of a power-on process to be executed when the image reader is powered on, in the illustrative embodiment according to one or more aspects of the present disclosure.

Subsequently, referring to FIG. 3, an explanation will be provided of a power-on process to be executed by the controller CR. When the image reader SM is powered on, the controller CR launches a power-on process (M1) as shown in FIG. 3.

When the power-on process (M1) is launched, the controller CR controls the moving mechanism MM to move the reading unit RU, and changes the reading position from a position when the image reader SM was powered off to the home position HP (T1). Thereby, in the sub scanning direction, the reading position of the reading unit RU (i.e., a position of the image sensor IS) is made coincident with the position of the reference member BM.

The controller CR adjusts a light quantity LE for image reading (T2). Specifically, the controller CR controls the light source LS to emit light towards the reference member BM, and adjusts the light quantity LE of the light emitted by the light source LS in such a manner that analog data generated when the image sensor IS receives light reflected from the reference member BM becomes a maximum value acceptable for the A/D converter AD. It is noted that the light quantity LE is determined by a lighting time period and an electric current value for light emitting by the light source LS in one-line image reading.

The controller CR acquires black data BK (T3). Specifically, for instance, the controller CR turns off the light source LS, controls the reading unit RU to perform one-line image reading, and stores, into the memory ME, digital data generated by the one-line image reading as the black data BK. At this time, the digital data is dark output.

The controller CR acquires white data WT (T4). Specifically, for instance, the controller CR turns on and controls the light source LS to emit light of the light quantity LE, controls the reading unit RU to perform one-line image reading, and stores, into the memory ME, digital data generated by the one-line image reading as the white data WT.

The controller CR calculates a cover criterion value THco (T5). Specifically, for instance, the controller CR acquires the black data BK from the memory ME, and determines a black data maximum value BKmax by extracting a maximum value in the non-document-placed region NDR from among the black data BK. Further, the controller CR determines the cover criterion value THco as a value derived from multiplying the black data maximum value BKmax by 1.1.

The controller CR controls the moving mechanism MM to move the reading unit RU, and changes the reading position from the home position HP to the A4-landscape position LP (T6). Thereby, in the sub scanning direction, the reading position of the reading unit RU is changed to a position corresponding to the opposed side of the A4-landscape document DC. It is noted that the "position corresponding to the opposed side" denotes a position slightly shifted inward of the document from the opposed side (e.g., a position shifted by 3 mm inward of the document from the opposed side).

The controller CR acquires setting values from the memory ME (T7). The setting values include a reading range and a reading resolution. For instance, as the reading range in the main scanning direction, a maximum readable range that makes it possible to read the non-document-placed region NDR may be set. As the reading resolution, 300 dpi may be set.

The controller CR determines whether ambient light has been detected (T8). Specifically, for instance, the controller CR determines whether every piece of digital data of specific pixels in the non-document-placed region NDR is equal to or higher than the cover criterion value THco. When determining that every piece of digital data of the specific pixels in the non-document-placed region NDR is equal to or higher than the cover criterion value THco, the controller CR determines that ambient light has been detected (T8: Yes), and goes to T9. In T9, the controller CR performs a document size determining process. When determining that every piece of digital data of the specific pixels in the non-document-placed region NDR is not equal to or higher than the cover criterion value THco, the controller CR determines that ambient light has not been detected (T8: No), and goes to T10. In T10, the controller CR determines whether a reading start button has been pressed. During a period of time when the reading start button is not pressed (T10: No), the controller CR repeatedly performs the operation in T8 and always monitors whether ambient light has been detected. It is noted that the specific pixels in the non-document-placed region NDR may be all pixels positioned in the non-document-placed region NDR, or may be a plurality of pixels positioned close to an end portion of the transparent plate TP that is far from the reference point OP in the main scanning direction.

The controller CR performs a document size determining process to determine a document size (T9). As will be described in detail later, the controller CR determines existence/nonexistence of a document, using digital data of the margin region MR. Thereafter, the controller CR generates acquisition timing to acquire gradation values SZA for determining the document size, using digital data of the non-document-placed region NDR, and determines the document size using the gradation values SZA acquired with the generated acquisition timing.

The controller CR determines whether the reading start button has been pressed (T10). When determining that the reading start button has been pressed (T10: Yes), the controller CR goes to T11 and performs a reading process. Meanwhile, when determining that the reading start button has not been pressed (T10: No), the controller CR goes back to T8 and determines whether ambient light has been detected.

The controller CR controls the reading unit RU to perform image reading (T11). As will be described in detail later, the controller CR sets a reading range in conformity to the document size determined in the document size determining process (T9), and controls the reading unit RU to perform image reading while controlling the moving mechanism MM.

[Document Size Determining Process]

Figure 4A:
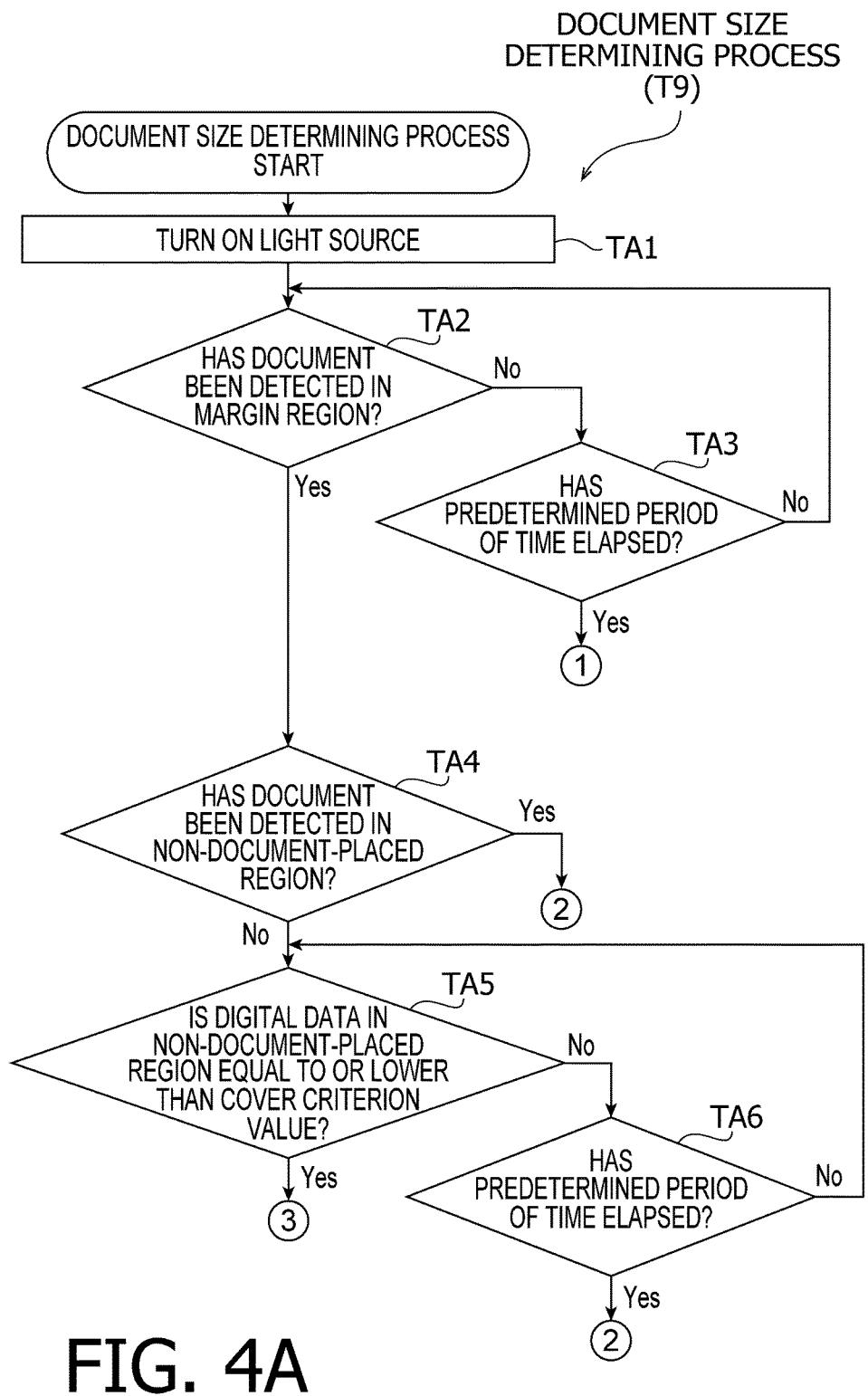
FIGS. 4A and 4B are flowcharts showing a procedure of a document size determining process in the illustrative embodiment according to one or more aspects of the present disclosure.
Figure 4B:
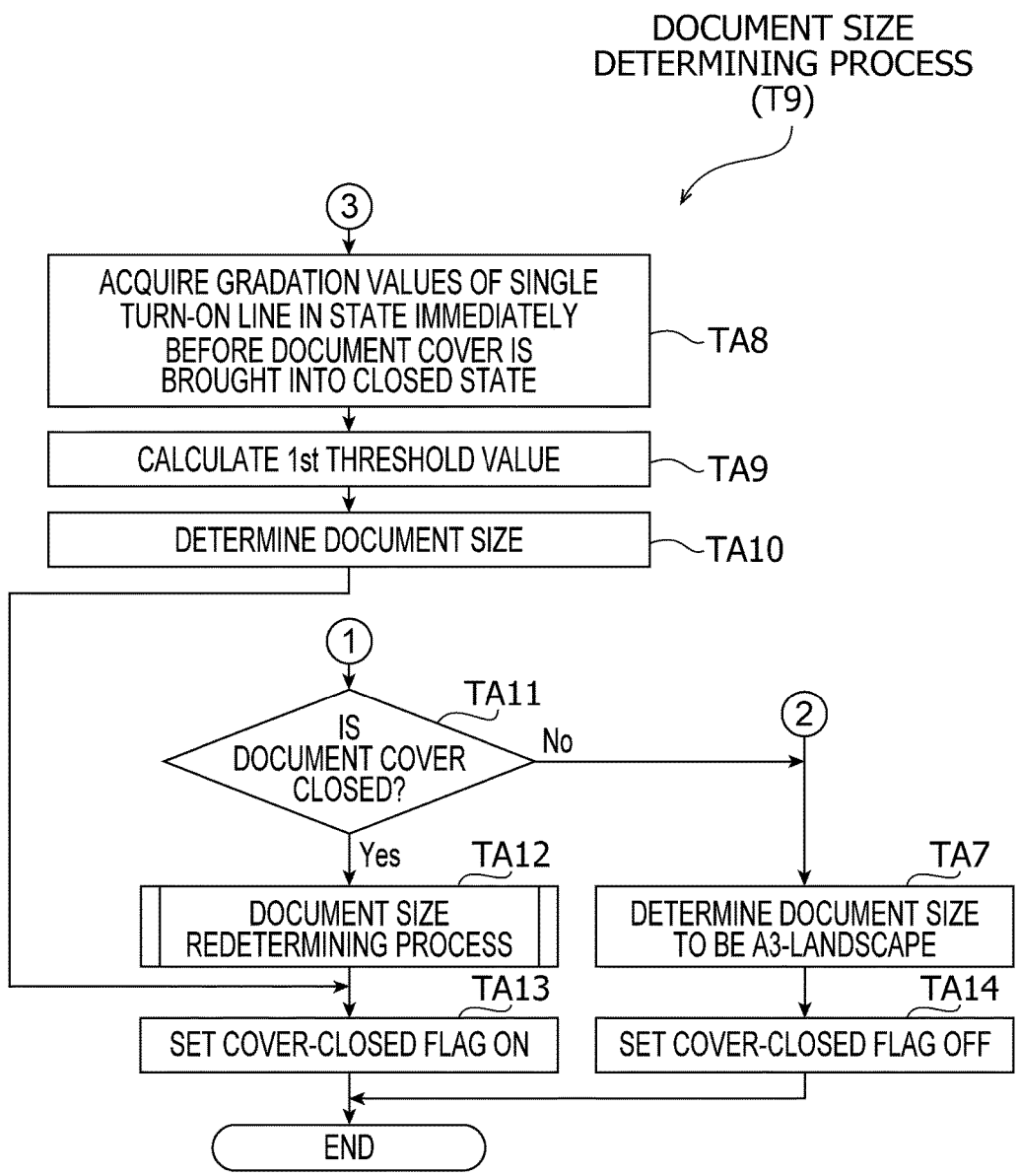

Referring to FIGS. 4A and 4B, the document size determining process (T9) will be described. The document size determining process (T9) is performed in response to the determination in T8 that ambient light has been detected (T8: Yes). Namely, the document size determining process (T9) is started when the document cover CV is opened and ambient light is incident into the reading unit RU staying in the A4-landscape position LP.

In the document size determining process, the controller CR performs lighting control for the light source LS (TA1). Specifically, for instance, the controller CR performs the lighting control with two lines (i.e., a turn-on line and a turn-off line) as one reading line for image reading in the main scanning direction. In the turn-on line, the light source LS is controlled to emit light of the light quantity LE. In the turn-off line, the light source LS is turned off. In the illustrative embodiment, a case where the turn-on line is a single line will be described. Nonetheless, the light source LS may be configured to sequentially emit red light, green light, and blue light. In this case, the turn-on line may include three lines illuminated with the red light, the green light, and the blue light, respectively.

The controller CR determines whether a document has been detected in the margin region MR (TA2). Namely, with respect to each of specific pixels in the margin region MR, the controller CR determines whether a difference between digital data of the turn-on line and digital data of the turn-off line is equal to or lower than a document criterion value. When determining that the difference between digital data of the turn-on line and digital data of the turn-off line is equal to or lower than the document criterion value, the controller CR determines that a document has not been detected in the margin region MR (TA2: No), and goes to TA3. In TA3, the controller CR determines whether a predetermined period of time has elapsed. Meanwhile, when determining that the difference between digital data of the turn-on line and digital data of the turn-off line is higher than the document criterion value, the controller CR determines that a document has been detected in the margin region MR (TA2: Yes), and goes to TA4. In TA4, the controller CR determines whether the document has been detected in the non-document-placed region NDR. Until the predetermined period of time has elapsed (i.e., while making a negative determination in TA3 (TA3: No)), the controller CR repeatedly performs the operation in TA2 and always monitors whether a document has been detected in the margin region MR. It is noted that the document criterion value, which is used for determination as to whether a document has been detected in the margin region MR, needs to be set larger than a fluctuation amount of random noises superimposed on the analog data. Further, the specific pixels in the margin region MR may be all pixels positioned in the margin region MR, or may be a plurality of pixels positioned at an end portion of the transparent plate TP that is close to the reference point OP in the main scanning direction.

The controller CR determines whether the predetermined period of time has elapsed (TA3). When determining that the predetermined period of time has elapsed (TA3: Yes), the controller CR goes to TA11, and determines whether the document cover CV is closed. Meanwhile, when determining that the predetermined period of time has not elapsed (TA3: No), the controller CR goes back to TA2, and determines whether a document has been detected in the margin region MR.

The controller CR determines whether the document has been detected in the non-document-placed region NDR (TA4). Namely, with respect to each of the specific pixels in the non-document-placed region NDR, the controller CR determines whether a difference between digital data of the turn-on line and digital data of the turn-off line is equal to or lower than the document criterion value. When determining that the difference between digital data of the turn-on line and digital data of the turn-off line is equal to or lower than the document criterion value, the controller CR determines that the document has not been detected in the non-document-placed region NDR (TA4: No), and goes to TA5. In TA5, the controller CR determines whether every piece of digital data of the specific pixels in the non-document-placed region NDR of the turn-off line is equal to or lower than the cover criterion value THco. Meanwhile, when determining that the difference between digital data of the turn-on line and digital data of the turn-off line is higher than the document criterion value, the controller CR determines that the document has been detected in the non-document-placed region NDR (TA4: Yes), and goes to TA7. In TA7, the controller CR determines the document size to be an A3-landscape size. When a document has been detected in the non-document-placed region NDR, the document size is determined to be the A3-landscape size as a maximum readable size.

The controller CR determines whether every piece of digital data of specific pixels in the non-document-placed region NDR of the turn-off line is equal to or lower than the cover criterion value THco (TA5). When determining that every piece of digital data of specific pixels in the non-document-placed region NDR of the turn-off line is equal to or lower than the cover criterion value THco (TA5: Yes), the controller CR determines that the document cover CV is in a state immediately before the document cover CV is brought into a closed state, and goes to TA8. In TA8, the controller CR executes a line data acquiring operation. When determining that every piece of digital data of specific pixels in the non-document-placed region NDR of the turn-off line is higher than the cover criterion value THco (TA5: No), the controller CR determines that the document cover CV is in an open state, and goes to TA6. In TA6, the controller CR determines whether a predetermined period of time has elapsed. Until the predetermined period of time has elapsed (i.e., while making a negative determination in TA6 (TA6: No)), the controller CR repeatedly performs the operation in TA5 and always monitors the open/closed state of the document cover CV. It is noted that a point of time "immediately before the document cover CV is brought into the closed state" is the acquisition timing to acquire the gradation values SZA for determining the document size.

The controller CR determines whether a predetermined period of time has elapsed (TA6). When determining that the predetermined period of time has elapsed (TA6: Yes), the controller CR goes to TA7 and determines the document size to be the A3-landscape size. When determining that the predetermined period of time has not elapsed (TA6: No), the controller CR goes back to TA5. Namely, when every piece of digital data of specific pixels in the non-document-placed region NDR of the turn-off line is not equal to or lower than the cover criterion value THco (TA5: No) even after the predetermined period of time has elapsed (TA6: Yes), the controller CR determines that the document cover CV is in the open state, and determines the document size to be the A3-landscape size (TA7).

The controller CR determines the document size to be the A3-landscape size (TA7).

The controller CR acquires the gradation values SZA of a single turn-on line in the state immediately before the document cover CV is brought into the closed state (TA8).

The controller CR calculates a first threshold value SZ1 (TA9). Specifically, for instance, the controller CR determines, as the first threshold value SZ1, an average value between a gradation value BL1 and a gradation value NO1. The gradation value BL1 represents an intermediate value, in the margin region MR, of the gradation values SZA acquired in TA8. The gradation value NO1 represents an intermediate value, in the non-document-placed region NDR, of the gradation values SZA acquired in TA8. The "intermediate value" indicates a gradation value of a pixel positioned in a middle of all pixels in a specified region that are arranged in ascending order of gradation values. The gradation value BL1 is defined as the intermediate value, in the margin region MR, of the gradation values SZA. Nonetheless, the gradation value BL1 may be defined as an average value of gradation values of all the pixels in the margin region MR. Further, the gradation value NO1 may be defined as an average value of gradation values of all the pixels in the non-document-placed region NDR.

The controller CR determines the document size (TA10). Specifically, for instance, the controller CR determines, as a document end portion, a position of a pixel that is closest to the non-document-placed region NDR among pixels that indicate gradation values lower than the first threshold value SZ1 among the gradation values SZA of a single turn-on line. The controller CR determines, as a document size in the main scanning direction, a distance between the reference line passing through the reference point OP in the sub scanning direction and the document end portion. The controller CR determines the document size, based on the determined document size in the main scanning direction and the determination that the document size in the sub scanning direction is equal to or more than the A4-landscape size. In this respect, nonetheless, when the determined document size in the main scanning direction is different from standardized sheet sizes, the controller CR determines the document size in the sub scanning direction to be the A3-landscape size. Thus, since the document size is determined using the gradation values SZA in the A4-landscape position LP, it is possible to determine more document sizes than when the document size is detected in an A3-landscape position.

The controller CR determines whether the document cover CV is in the closed state (TA11). Namely, the controller CR determines whether every piece of digital data of the specific pixels in the non-document-placed region NDR of the turn-off line is equal to or lower than the cover criterion value THco. When determining that every piece of digital data of the specific pixels in the non-document-placed region NDR of the turn-off line is equal to or lower than the cover criterion value THco (TA11: Yes), the controller CR determines that the document cover CV is in the closed state, and goes to TA12. In TA12, the controller CR performs a document size redetermining process. When determining that every piece of digital data of the specific pixels in the non-document-placed region NDR of the turn-off line is higher than the cover criterion value THco (TA11: No), the controller CR determines that the document cover CV is in the open state, and goes to TA7. In TA7, the controller CR determines the document size to be the A3-landscape size.

The controller CR changes the reading position from the A4-landscape position LP to the reference position BP, and determines the document size (TA12). As will be described in detail later, the controller CR determines whether it is possible to calculate a threshold value for determining the document size without having to open the document cover CV. When determining that it is not possible to determine the document size without having to open the document cover CV, the controller CR displays instructions to prompt the user to open and close the document cover CV. In response to the user opening and closing the document cover CV, the controller CR determines the document size.

The controller CR sets a cover-closed flag ON (TA13). Namely, the controller CR sets ON the cover-closed flag stored in the memory ME.

The controller CR sets the cover-closed flag OFF (TA14). Namely, the controller CR sets OFF the cover-closed flag stored in the memory ME.

[Document Size Redetermining Process]

Figure 5A:
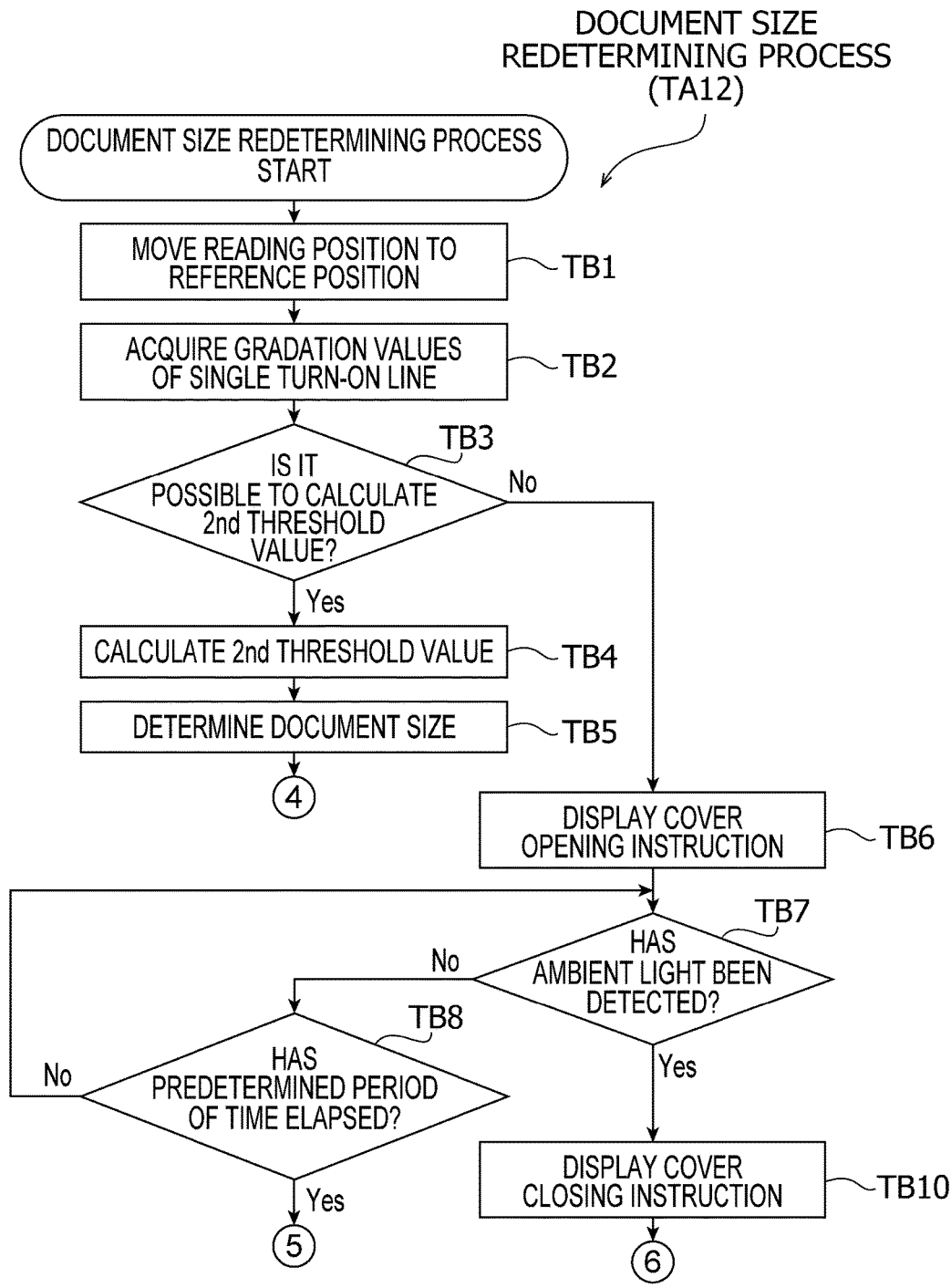
FIGS. 5A and 5B are flowcharts showing a procedure of a document size redetermining process in the illustrative embodiment according to one or more aspects of the present disclosure.
Figure 5B:
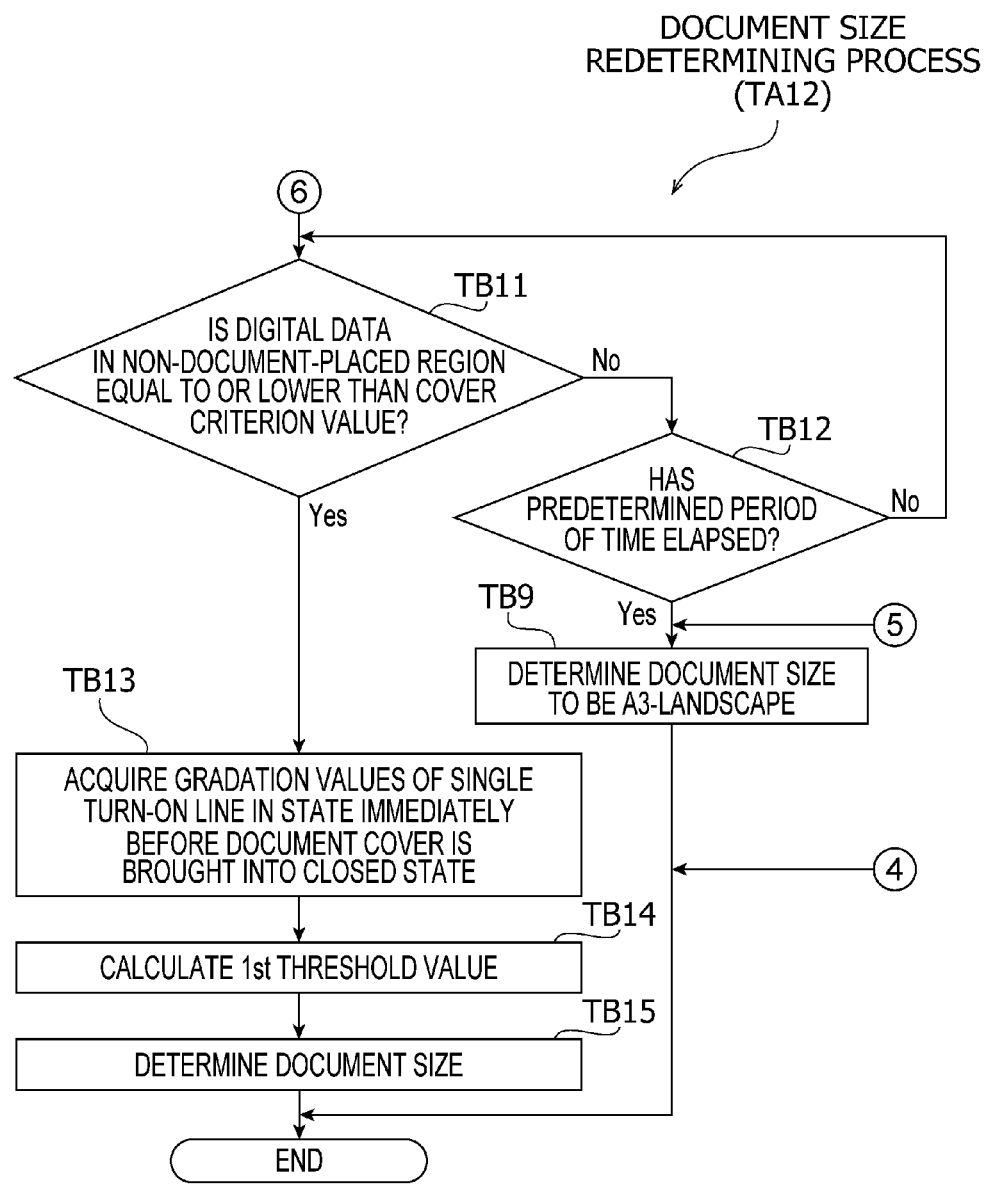

Referring to FIGS. 5A and 5B, the document size redetermining process (TA12) will be described. The document size redetermining process (TA12) is launched when a document has not been detected in the margin region MR in the A4-landscape position LP as the reading position (TA2: No) and the document cover CV is in the closed state (TA11: Yes). Thus, the document size redetermining process (TA12) is launched when the document size in the sub scanning direction is less than the A4-landscape size.

The controller CR controls the moving mechanism MM to move the reading unit RU and changes the reading position from the A4-landscape position LP to the reference position BP (TB1). Thereby, in the sub scanning direction, the reading position of the reading unit RU becomes a position corresponding to the reference side of the document. It is noted that the "position corresponding to the reference side" denotes a position slightly shifted inward of the document from the reference side (e.g., a position shifted by 3 mm inward of the document from the reference side).

The controller CR acquires gradation values SZB of a single turn-on line. Namely, the controller CR acquires the gradation values SZB of a single turn-on line when the document cover CV is in the closed state (TB2).

The controller CR determines whether it is possible to calculate a second threshold value SZ2 for determining the document size (TB3). Specifically, for instance, the controller CR calculates a difference between a gradation value BL2 and a gradation value NO2. The gradation value BL2 represents an intermediate value, in the margin region MR, of the gradation values SZB. The gradation value NO2 represents an intermediate value, in the non-document-placed region NDR, of the gradation values SZB. The "intermediate value" indicates a gradation value of a pixel positioned in a middle of all pixels in a specified region that are arranged in ascending order of gradation values. When the calculated difference is equal to or more than a predetermined value, the controller CR determines that it is possible to calculate the second threshold value SZ2 (TB3: Yes), and goes to TB4. In TB4, the controller CR calculates the second threshold value SZ2. When the calculated difference is less than the predetermined value, the controller CR determines that it is not possible to calculate the second threshold value SZ2 (TB3: No), and goes to TB6. In TB6, the controller CR executes a cover-open display operation. For instance, the predetermined value may be set to 5% of a difference between a white level and a black level.

In the same manner as executed in TA9, the controller CR calculates an average value between the gradation value BL2 and the gradation value NO2, and sets the calculated average value to the second threshold value SZ2 (TB4). As described above, in the illustrative embodiment, the gradation value BL2 is the intermediate value, in the margin region MR, of the gradation values SZB. Nonetheless, the gradation value BL2 may be an average value of all the pixels in the margin region MR. Likewise, the gradation value NO2 may be an average value of all the pixels in the non-document-placed region NDR.

The controller CR determines the document size (TB5). Specifically, for instance, the controller CR determines, as a document end portion, a position of a pixel that is closest to the non-document-placed region NDR among pixels that indicate gradation values lower than the second threshold value SZ2 among the gradation values SZB of a single turn-on line. The controller CR determines, as a document size in the main scanning direction, a distance between the reference line and the document end portion. The controller CR determines the document size, based on the determined document size in the main scanning direction and the determination that the document size in the sub scanning direction is less than the A4-landscape size. In this respect, nonetheless, when the determined document size in the main scanning direction is different from the standardized sheet sizes, the controller CR determines the document size in the sub scanning direction to be the A3-landscape size.

The controller CR controls the display mechanism DM to display a cover opening instruction to prompt the user to open the document cover CV (TB6).

The controller CR determines whether ambient light has been detected (TB7). Specifically, for instance, the controller CR determines whether every piece of digital data of specific pixels in the non-document-placed region NDR is equal to or higher than the cover criterion value THco. When determining that every piece of digital data of specific pixels in the non-document-placed region NDR is equal to or higher than the cover criterion value THco, the controller CR determines that ambient light has been detected (TB7: Yes), and goes to TB10. In TB10, the controller CR controls the display mechanism DM to display a cover closing instruction to prompt the user to close the document cover CV. When determining that every piece of digital data of specific pixels in the non-document-placed region NDR is lower than the cover criterion value THco, the controller CR determines that ambient light has not been detected (TB7: No), and goes to TB8.

In TB8, the controller CR determines whether a predetermined period of time has elapsed. When determining that the predetermined period of time has elapsed (TB8: Yes), the controller CR goes to TB9 and determines the document size to be the A3-landscape size. When determining that the predetermined period of time has not elapsed (TB8: No), the controller CR goes back to TB7. When determining in TB7 that ambient light has not been detected (TB7: No) and determining in TB8 that the predetermined period of time has elapsed (TB8: Yes), the controller CR determines that the document cover CV is not open, and goes to TB9.

In TB9, the controller CR determines the document size to be the A3-landscape size.

The controller CR controls the display mechanism DM to display a cover closing instruction to prompt the user to close the document cover CV (TB10).

The controller CR determines whether every piece of digital data of specific pixels in the non-document-placed region NDR of the turn-off line is equal to or lower than the cover criterion value THco (TB11). When determining that every piece of digital data of specific pixels in the non-document-placed region NDR of the turn-off line is equal to or lower than the cover criterion value THco (TB11: Yes), the controller CR determines that the document cover CV is in a state immediately before the document cover CV is brought into the closed state, and goes to TB13. In TB13, the controller CR executes a line data acquiring operation. When determining that every piece of digital data of specific pixels in the non-document-placed region NDR of the turn-off line is higher than the cover criterion value THco (TB11: No), the controller CR determines that the document cover CV is in the open state, and goes to TB12. In TB12, the controller CR determines whether a predetermined period of time has elapsed. It is noted that a point of time "immediately before the document cover CV is brought into the closed state" is acquisition timing to acquire gradation values for determining the document size. When determining in TB12 that the predetermined period of time has elapsed (TB12: Yes), the controller CR determines that the document cover CV remains in the open state, and goes to TB9. In TB9, the controller CR determines the document size to be the A3-landscape size.

A line data acquiring operation (TB13), a threshold value calculating operation (TB14), and a document size determining operation (TB15) are substantially the same as the operations in TAB, TA9, and TA10, respectively. Therefore, explanations of the operations in TB13, TB14, and TB15 will be omitted. By the operations in TB13, TB14, and TB15, the document size is determined.

[Reading Process]

Figure 6A:
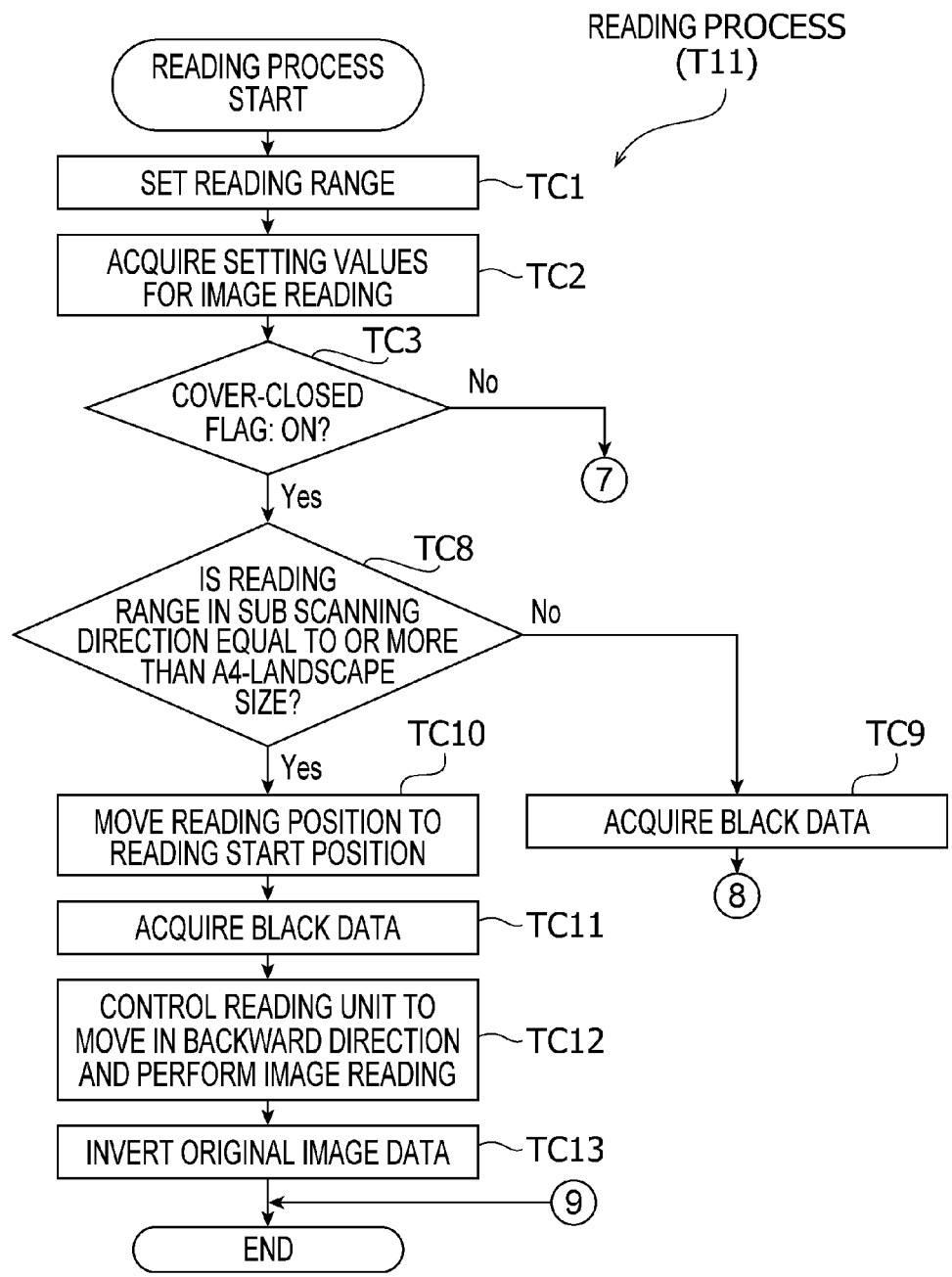
FIGS. 6A and 6B are flowcharts showing a procedure of a reading process in the illustrative embodiment according to one or more aspects of the present disclosure.
Figure 6B:
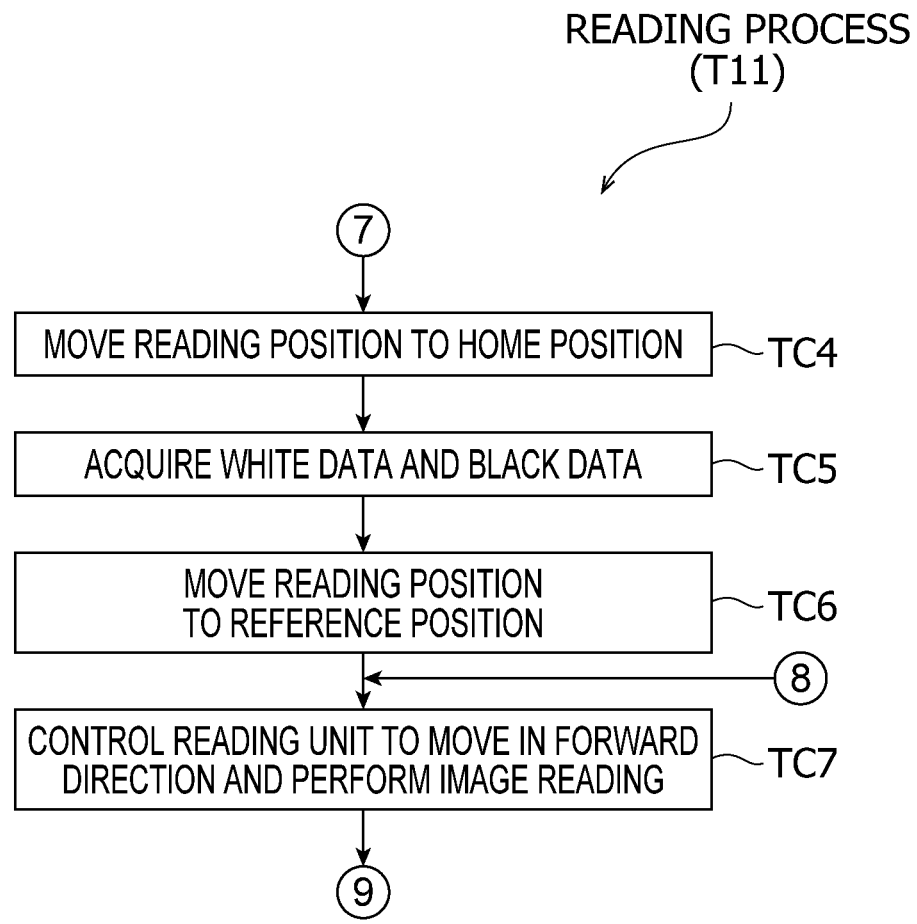

Referring to FIGS. 6A and 6B, the reading process (T11) will be described. The reading process (T11) is launched when the controller CR determines in T10 that the reading start button has been pressed (T10: Yes).

The controller CR sets a reading range (TC1). Specifically, for instance, when the document size has been determined in the document size determining process (T9), the controller CR sets the determined document size as a reading range. When the document size determining process (T9) has not been performed, and the document size has not been determined, the controller CR sets the reading range to the A3-landscape size.

The controller CR acquires setting values for image reading from the memory ME (TC2). For instance, the setting values include a reading resolution. The controller CR sets the reading resolution to 300 dpi.

The controller CR determines whether the cover-closed flag is set ON (TC3). When determining that the cover-closed flag is set ON (TC3: Yes), the controller CR goes to TC8. In TC8, the controller CR determines whether the reading range in the sub scanning direction is equal to or more than the A4 size. Meanwhile, when determining that the cover-closed flag is set OFF (TC3: No), the controller CR goes to TC4. In TC4, the controller CR changes the reading position to the home position HP.

The controller CR controls the moving mechanism MM to move the reading unit RU and changes the reading position to the home position HP (TC4). Thereby, in the sub scanning direction, the reading position of the reading unit RU is set to the home position HP to face the reference member BM.

The controller CR acquires white data and black data (TC5). Specifically, for instance, the controller CR turns off the light source LS, controls the reading unit RU to perform one-line image reading, and stores, into the memory ME, digital data generated by the one-line image reading as black data BK. Further, the controller CR turns on and controls the light source LS to emit light of the light quantity LE, controls the reading unit RU to perform one-line image reading, and stores, into the memory ME, digital data generated by the one-line image reading as white data WT.

The controller CR controls the moving mechanism MM to move the reading unit RU and changes the reading position from the home position HP to the reference position BP (TC6). Thereby, in the sub scanning direction, the reading position of the reading unit RU is set to a position corresponding to the reference side of the document. It is noted that the "position corresponding to the reference side" denotes a position slightly shifted inward of the document from the reference side (e.g., a position shifted by 3 mm inward of the document from the reference side).

The controller CR controls the reading unit RU to move in a forward direction and perform image reading (TC7). Specifically, for instance, the controller CR controls the moving mechanism MM to move the reading unit RU over the reading range set in TC1 from the reference position BP, and controls the reading unit RU to generate image data of gradation values. It is noted that the "forward direction" denotes such a direction as to become farther away from the reference point OP along the sub scanning direction.

The controller CR determines whether the reading range in the sub scanning direction is equal to or more than the A4-landscape size (TC8). When determining that the reading range in the sub scanning direction is equal to or more than the A4-landscape size (TC8: Yes), the controller CR goes to TC10. In TC10, the controller CR moves the reading position to a reading start position. Meanwhile, when determining that the reading range in the sub scanning direction is less than the A4-landscape size (TC8: No), the controller CR goes to TC9. In TC9, the controller CR performs a black data acquiring operation.

The controller CR acquires black data (TC9). Specifically, for instance, the controller CR turns off the light source LS, controls the reading unit RU to perform one-line image reading, and stores, into the memory ME, digital data generated by the one-line image reading as the black data BK. After the black data acquiring operation (TC9), the controller CR goes to TC7 and executes the forward-direction reading operation.

The controller CR controls the moving mechanism MM to move the reading unit RU and changes the reading position to the reading start position (TC10). Specifically, for instance, the controller CR changes the reading position to the reading start position as a position corresponding to the opposed side of the document that corresponds to the reading range set in TC1. When the document cover CV is in the closed state, and the document size in the sub scanning direction is determined to be equal to or more than the A4-landscape size, the document size is determined with the reading position as the A4-landscape position LP. Hence, it is possible to start image reading from the opposed side of the document that is positioned within a short moving distance from the A4-landscape position LP. Thus, it is possible to start image reading more quickly.

The controller CR acquires black data (TC11). Specifically, for instance, the controller CR turns off the light source LS, controls the reading unit RU to perform one-line image reading, and stores, into the memory ME, digital data generated by the one-line image reading as the black data BK.

The controller CR controls the reading unit RU to move in a backward direction and perform image reading (TC12). Specifically, the controller CR controls the moving mechanism MM to move the reading unit RU from the reading start position, which is the opposed side of the document, to the reference position BP, and controls the reading unit RU to generate image data of gradation values. It is noted that the "backward direction" denotes such a direction as to become closer to the reference point OP along the sub scanning direction.

The controller CR inverts the original image data generated in TC12 (TC13). Specifically, for instance, the controller CR performs a line replacement operation such that a final line of the original image data becomes a leading line of the inverted image data and that a leading line of the original image data becomes a final line of the inverted image data.

[Specific Examples of Digital Data and Gradation Values in Each Cover State]

Referring to FIGS. 7 and 8, a specific explanation will be provided of an example in which a document of the A3-landscape size is placed on the transparent plate TP. In the illustrative embodiment, the following explanation will be provided under an assumption that high-intensity ambient light is incident to the reading unit RU, and the document has a background color that is slightly darker than white of the reference member BM and has such a thickness as to prevent light transmission through the document. Further, in the following example, the document of the A3-landscape size is placed. Therefore, the document is not placed on the non-document-placed region NDR but placed on the other region. When the document cover CV is in the closed state, the document cover CV is completely closed, and ambient light has no influence on image reading for the document.

Figure 7A:
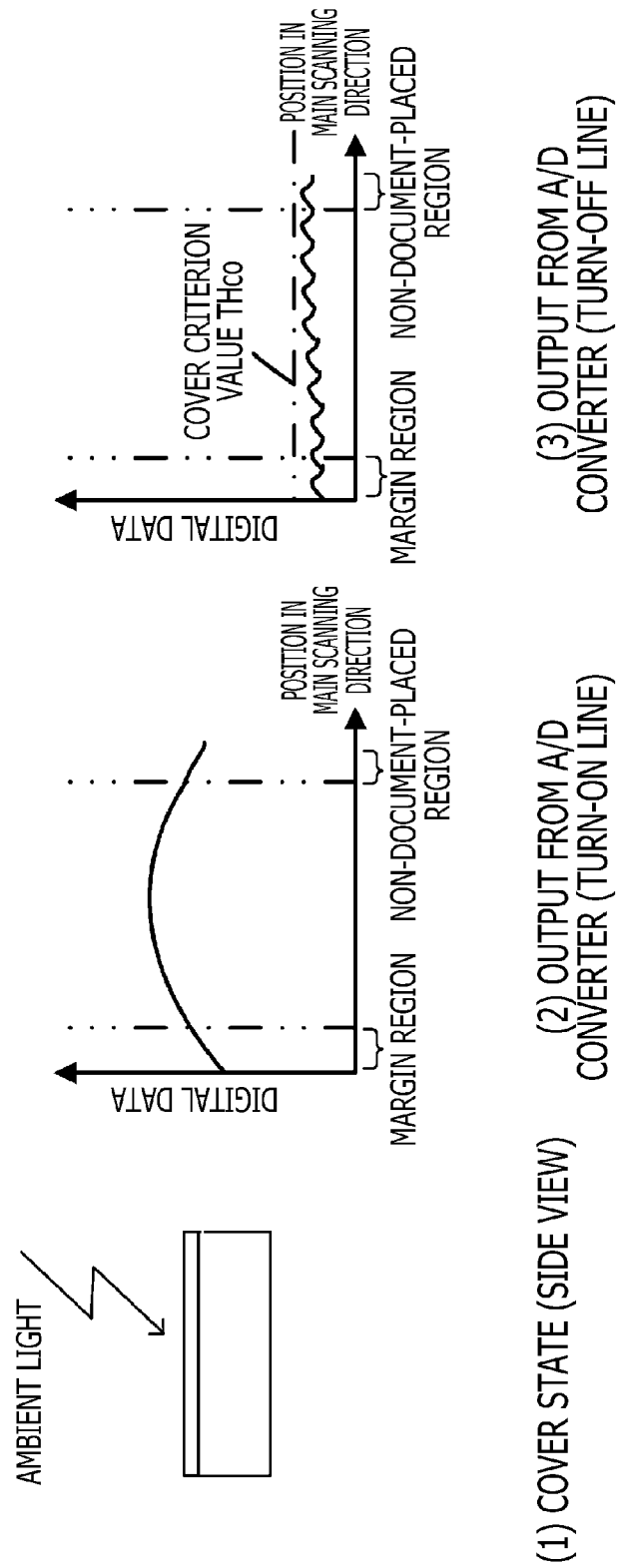
Figure 7C:
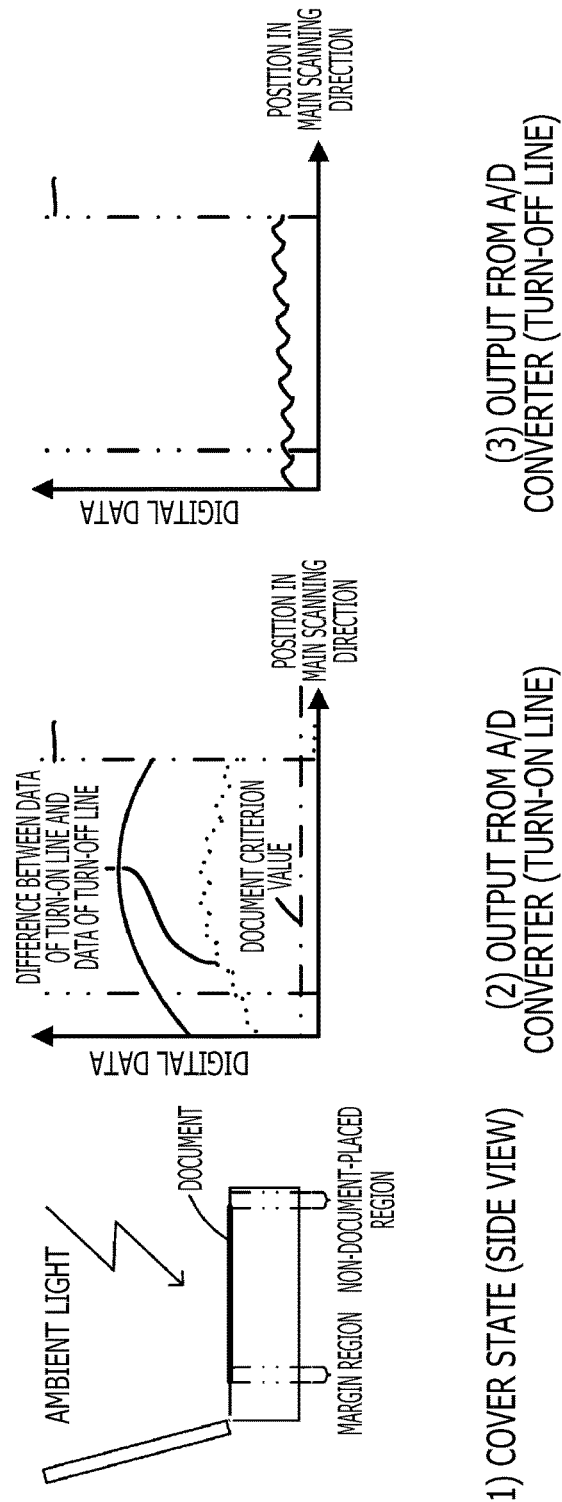
Figure 7D:
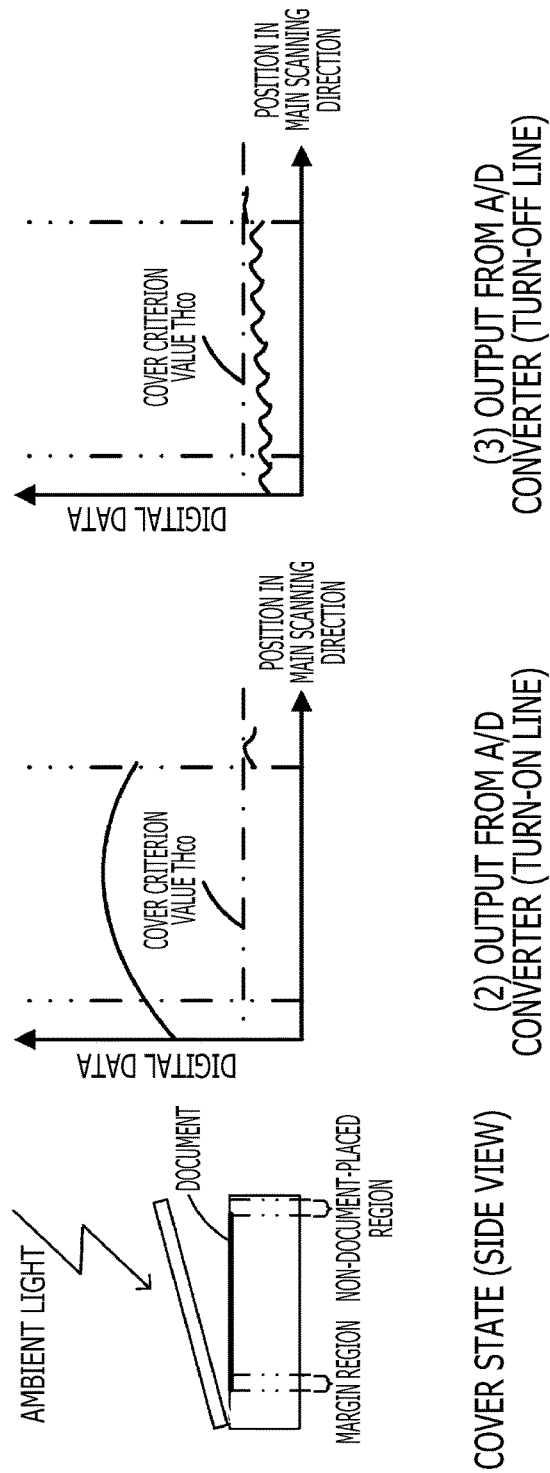
Figure 7E:
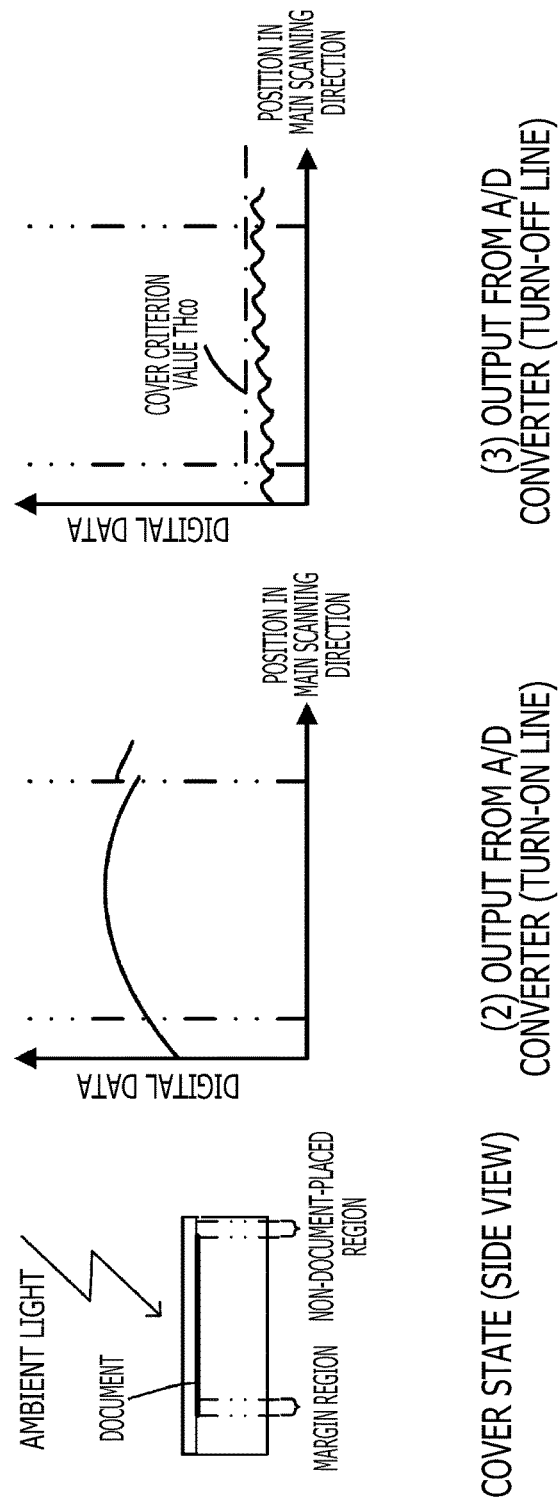

Each of FIGS. 7A to 7E shows a relationship between the position in the main scanning direction (hereinafter, which may be referred to as a "main scanning position") and digital data in a corresponding state of the document cover CV. The digital data is a value of an output signal from the A/D convertor AD. FIG. 7A shows a state where the document cover CV is closed, and the document is not placed on the transparent plate TP. FIG. 7B shows a state where the document cover CV is open, and the document is not placed. FIG. 7C shows a state where the document cover CV is open, and the document is placed. FIG. 7D shows a state immediately before the document cover CV is brought into the closed state, with the document placed. FIG. 7E shows a state where the document cover CV is closed, and the document is placed. Further, a leftmost section (1) of each of FIGS. 7A to 7E is a side view of the image reader SM from the left in FIG. 1A. A middle section (2) of each of FIGS. 7A to 7E shows a relationship between the main scanning position and the digital data when the light source LS is emitting light of the light quantity LE. A rightmost section (3) of each of FIGS. 7A to 7E shows a relationship between the main scanning position and the digital data when the light source LS is turned off. In FIGS. 7A to 7E and FIGS. 8A to 8E, each alternate long and two short dashed line indicates a boundary of the margin region MR or a boundary of the non-document-placed region NDR with respect to the main scanning position. More specifically, with respect to the main scanning position, the margin region MR is identified between a leading pixel position and the alternate long and two short dashed line that is closer to the leading pixel position. The non-document-placed region NDR is identified between a final pixel position and the alternate long and two short dashed line that is closer to the final pixel position.

Figure 8A:
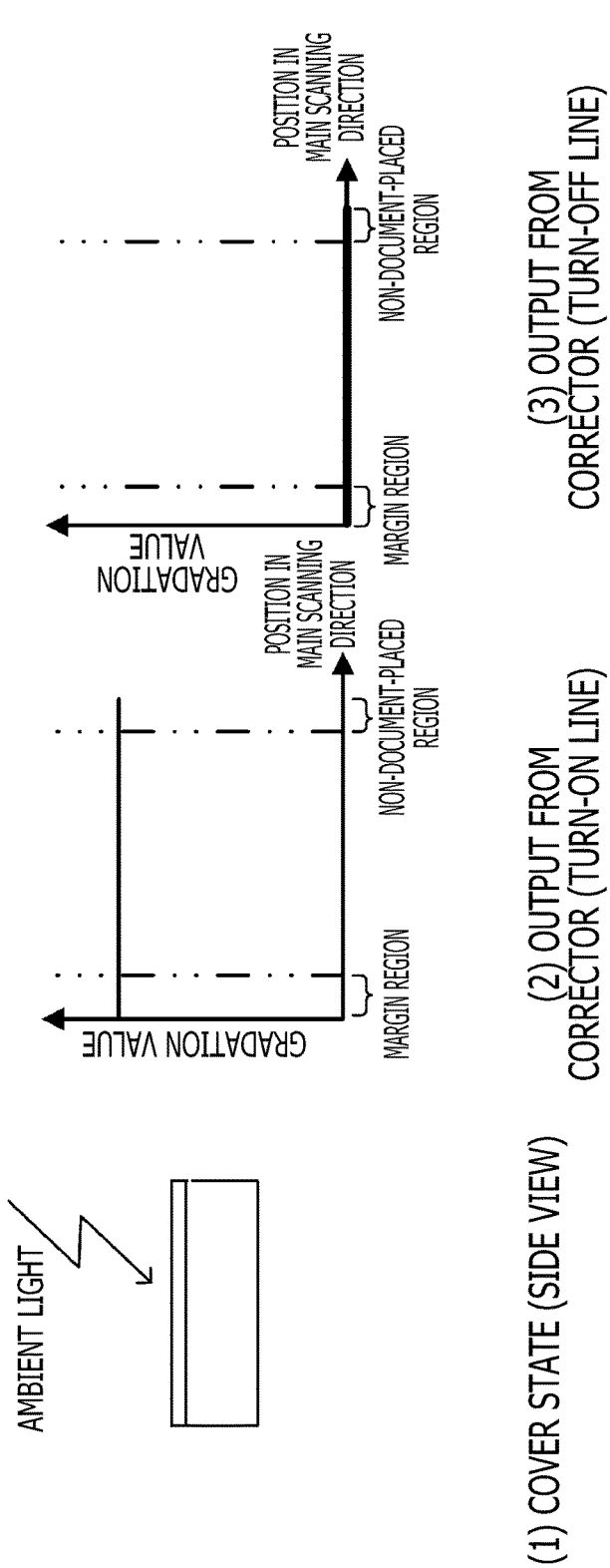
Figure 8B:
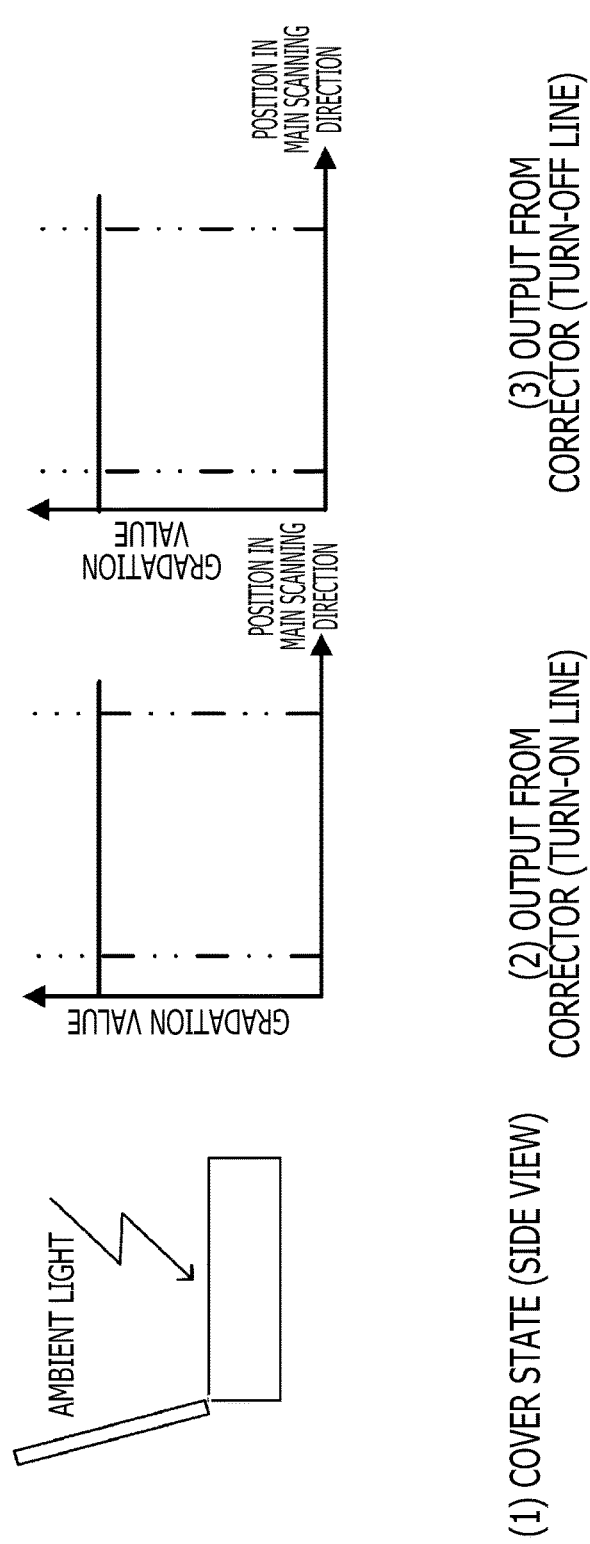
Figure 8C:
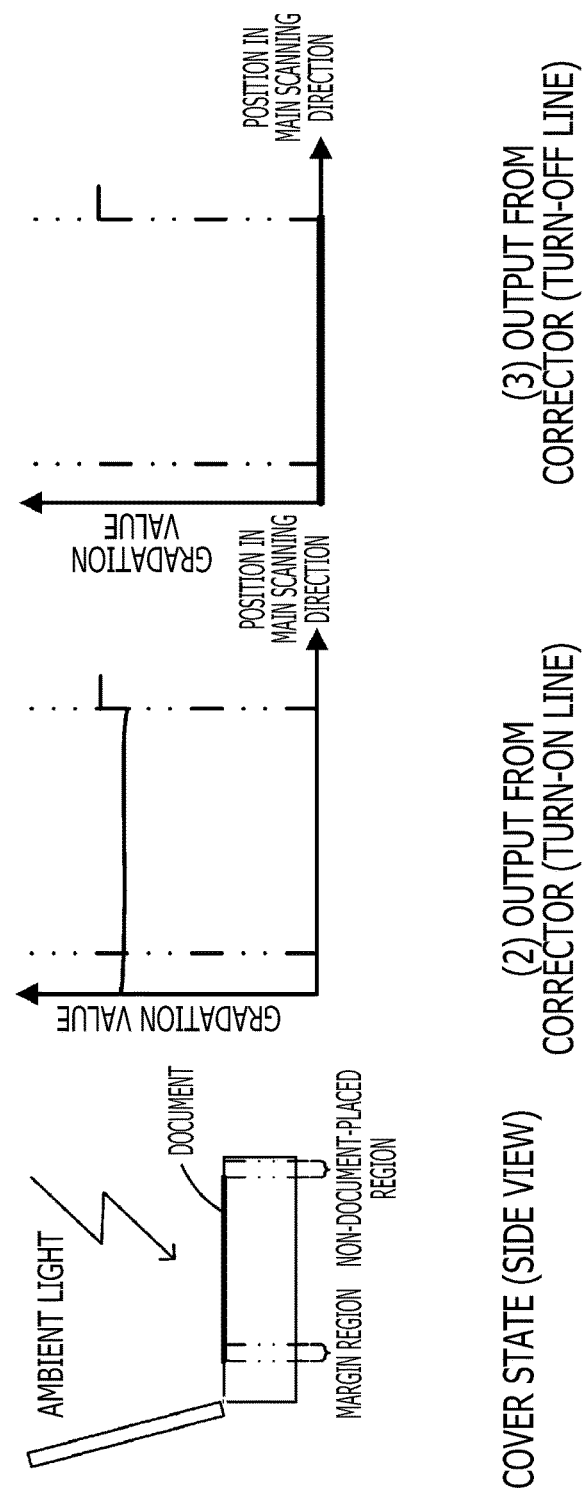
Figure 8E:
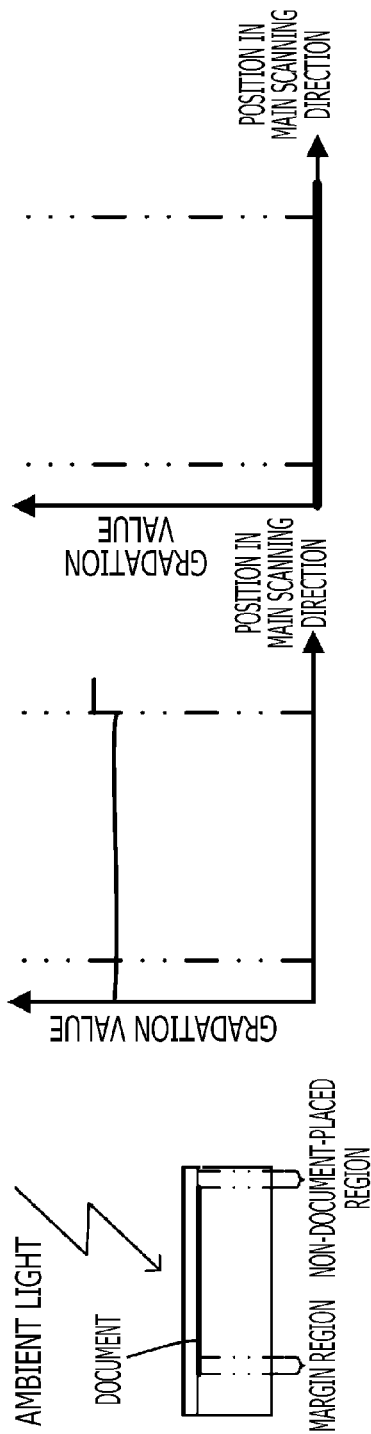

Each of FIGS. 8A to 8E shows a relationship between the main scanning position and a gradation value in a corresponding cover state. The gradation value is a value of an output signal from the corrector SC. FIG. 8A shows the state where the document cover CV is closed, and the document is not placed. FIG. 8B shows the state where the document cover CV is open, and the document is not placed. FIG. 8C shows the state where the document cover CV is open, and the document is placed. FIG. 8D shows the state immediately before the document cover CV is brought into the closed state, with the document placed. FIG. 8E shows a state where the document cover CV is closed, and the document is placed. Further, a leftmost section (1) of each of FIGS. 8A to 8E is a side view of the image reader SM from the left in FIG. 1A. A middle section (2) of each of FIGS. 8A to 8E shows a relationship between the main scanning position and the gradation value when the light source LS is emitting light of the light quantity LE. A rightmost section (3) of each of FIGS. 8A to 8E shows a relationship between the main scanning position and the gradation value when the light source LS is turned off.

An explanation will be provided of output results of the digital data and the gradation value in each cover state, with reference to FIGS. 7A to 7E and 8A to 8E.

In the state where the document cover CV is closed without the document placed on the transparent plate TP (see FIGS. 7A and 8A), the document cover CV is closed relative to the main body MB, and thus the reading unit RU is not affected by ambient light. Further, the document is not placed on the image reader SM. Hence, the reading unit RU reads a downward-facing surface (white) of the document cover CV. Therefore, when the light source LS is turned on, and image reading is performed, as shown in the middle section (2) of FIG. 7A, the digital data is as high as output levels when the reading unit RU reads the reference member BM. Further, as shown in the middle section (2) of FIG. 8A, the gradation value is as high as a maximum value representing the white color. When the light source LS is turned off, and image reading is performed, as shown in the rightmost section (3) of FIG. 7A, the digital data is as low as a dark output level. Further, as shown in the rightmost section (3) of FIG. 8A, the gradation value is as low as a minimum value representing the black color.

In the state where the document cover CV is open without the document placed on the transparent plate TP (see FIGS. 7B and 8B), the document cover CV is open relative to the main body MB, and thus the reading unit RU is affected by ambient light. Further, the document is not placed on the image reader SM. Hence, the reading unit RU is affected by ambient light over an entire region thereof in the main scanning direction. Therefore, when the light source LS is turned on, and image reading is performed, as shown in the middle section (2) of FIG. 7B, the digital data has higher values than when the reading unit RU reads the reference member BM, due to influence of ambient light. Further, as shown in the middle section (2) of FIG. 8B, the gradation value is as high as the maximum value representing the white color. When the light source LS is turned off, and image reading is performed, as shown in the rightmost section (3) of FIG. 7B, the digital data has higher values than when the reading unit RU reads the reference member BM, due to influence of ambient light. Further, as shown in the rightmost section (3) of FIG. 8B, the gradation value is as high as the maximum value representing the white color.

In the illustrative embodiment, in the respective steps T8 and TB7 for determining whether ambient light has been detected, of the power-on process (M1) and the document size redetermining process (TA12), the controller CR determines whether the document cover CV is open, based on the determination as to whether the digital data in the non-document-placed region NDR when the light source LS is turned off is equal to or higher than the cover criterion value THco. Namely, as shown in the rightmost section (3) of FIG. 7A, in the state where the document cover CV is closed without the document placed on the transparent plate TP, the digital data in the non-document-placed region NDR is lower than the cover criterion value THco. Further, as shown in the rightmost section (3) of FIG. 7B, in the state where the document cover CV is open without the document placed on the transparent plate TP, the digital data in the non-document-placed region NDR is higher than the cover criterion value THco. By using the change in value of the digital data, it is possible to detect the open state of the document cover CV.

In the state where the document cover CV is open with the document placed on the transparent plate TP (see FIGS. 7C and 8C), the document cover CV is open relative to the main body MB, and thus the reading unit RU is affected by ambient light. Further, the document is placed on the image reader SM. Hence, the reading unit RU is affected by ambient light in the non-document-placed region NDR, while the reading unit RU is not affected by ambient light in the other region. Therefore, when the light source LS is turned on, and image reading is performed, as shown in the middle section (2) of FIG. 7C, the digital data in the non-document-placed region NDR has higher values than when the reading unit RU reads the reference member BM, due to influence of ambient light, while the digital data in the other region has output values corresponding to the background color. Further, as shown in the middle section (2) of FIG. 8C, the gradation values in the non-document-placed region NDR are as high as the maximum value representing the white color, while the gradation values in the other region are as high as a value representing the background color. When the light source LS is turned off, and image reading is performed, as shown in the rightmost section (3) of FIG. 7C, the digital data in the non-document-placed region NDR has high values than when the reading unit RU reads the reference member BM, due to influence of ambient light, while the digital data in the other region is as low as the dark output level. Further, as shown in the rightmost section (3) of FIG. 8C, the gradation values in the non-document-placed region NDR are as high as the maximum value representing the white color, while the gradation values in the other region are as low as the minimum value representing the black color.

In the illustrative embodiment, in the step TA2 of the document size determining process (T9), the controller CR determines whether a document has been detected in the margin region MR, using digital data in the margin region MR when the light source LS is caused to emit light of the light quantity LE and when the light source LS is turned off. Namely, in the margin region MR in the state where the document cover CV is open without the document placed on the transparent plate TP, the difference between the digital data when the light source LS is turned off and the digital data when the light source LS is turned on is equivalent to zero as indicated by a dashed line in the middle section (2) of FIG. 7B. Meanwhile, in the margin region MR in the state where the document cover CV is open with the document placed on the transparent plate TP, the difference between the digital data when the light source LS is turned off and the digital data when the light source LS is turned on is higher than the document criterion value as indicated by a dashed line in the middle section (2) of FIG. 7C. By using the change in value of the digital data, it is possible to detect the document.

Unlike the other states, the state immediately before the document cover CV is brought into the closed state with the document placed on the transparent plate TP (see FIGS. 7D and 8D) is a state where, when the light source LS is turned off, and image reading is performed, the digital data in the non-document-placed region NDR is equal to or lower than the cover criterion value THco. When the light source LS is turned off, and image reading is performed, in the state where the document cover CV is open with the document placed on the transparent plate TP (see FIGS. 7C and 8C), the digital data in the non-document-placed region NDR is affected by ambient light and has high values (see the rightmost section (3) of FIG. 7C). Meanwhile, in the state where the document cover CV is closed with the document placed on the transparent plate TP (see FIGS. 7E and 8E), the digital data in the non-document-placed region NDR is not affected by ambient light and is as low as the dark output level (see the rightmost section (3) of FIG. 7E). In the meantime, the cover criterion value THco is determined as a value derived from multiplying the black data maximum value BKmax by 1.1 (T5), and is substantially as low as the black data BK. Therefore, the state where the digital data in the non-document-placed region NDR is equal to or lower than the cover criterion value THco is a state where the digital data in the non-document-placed region NDR is hardly affected by ambient light, and is regarded as a state immediately before the document cover CV is brought into the closed state.

In the state immediately before the document cover CV is brought into the closed state with the document placed on the transparent plate TP (see FIGS. 7D and 8D), when the light source LS is turned on, and image reading is performed, as shown in the middle section (2) of FIG. 7D, the digital data in the non-document-placed region NDR has values around the cover criterion value THco, while the digital data in the other region has output values substantially corresponding to the background color. Further, as shown in the middle section (2) of FIG. 8D, the gradation values in the non-document-placed region NDR are around the corrected cover criterion value THco, while the gradation values in the other area are as high as the value representing the background color. When the light source LS is turned off, and image reading is performed, as shown in the rightmost section (3) of FIG. 7D, the digital data in the non-document-placed region NDR has values around the cover criterion value THco, while the digital data in the other region is as low as the dark output level. As shown in the rightmost section (3) of FIG. 8D, the gradation values in the non-document-placed region NDR are around the corrected cover criterion value THco, while the gradation values in the other region are as low as the minimum value representing the black color.

In the illustrative embodiment, in the respective steps TA5 and TB11 of the document size determining process (T9) and the document size redetermining process (TA15), the controller CR determines whether every piece of digital data of the specific pixels in the non-document-placed region NDR of the turn-off line is equal to or lower than the cover criterion value THco. As shown in the rightmost section (3) of FIG. 7C, in the state where the document cover CV is open, the digital data in the non-document-placed region NDR has higher values than when the reading unit RU reads the reference member BM, due to influence of ambient light. As shown in the middle section (3) of FIG. 7D, in the state immediately before the document cover CV is brought into the closed state, the digital data in the non-document-placed region NDR is less likely to be affected by ambient light, and has values around the cover criterion value THco. Namely, the digital data in the non-document-placed region NDR changes depending on the open/closed state of the document cover CV. By using the change, it is possible to detect the state immediately before the document cover CV is brought into the closed state.

In the illustrative embodiment, in the respective steps TA10 and TB15 of the document size determining process (T9) and the document size redetermining process (TA12), the controller CR determines the document size in the main scanning direction, using the gradation values when the light source LS is caused to emit light of the light quantity LE. As shown in the middle section (2) of FIG. 8D, when the light source LS is turned on, and image reading is performed, the gradation values in the non-document-placed region NDR are as high as the minimum value representing the black color, while the gradation values in the other region (i.e., a document-placed region) where the document is placed are based on the read data of the document. The end portion of the document opposed to the reference line in the main scanning direction is positioned closest to the non-document-placed region NDR within a range in which the gradation values are higher than the first threshold value SZ1, which is determined based on the gradation values in the margin region MR and the gradation values in the non-document-placed region NDR. In the illustrative embodiment, the boundary of the non-document-placed region NDR (i.e., the boundary between the document-placed region and the non-document-placed region NDR) is the end portion of the document opposed to the reference line in the main scanning direction. Thus, by using the gradation values, it is possible to suppress dispersion of the digital data and accurately identify the end portion of the document. It is noted that the "dispersion of the digital data" denotes that the digital data may include different pixel values expressing the same gradation.

In the state where the document cover CV is closed with the document placed on the transparent plate TP (see FIGS. 7E and 8E), the document cover CV is closed relative to the main body MB, and thus the reading unit RU is affected by ambient light. Further, the document is placed on the image reader SM. Hence, the reading unit RU reads the document in the document-placed region where the document is placed, while the reading unit RU reads the white downward-facing surface of the document cover CV in the non-document-placed region NDR where the document is not placed. Therefore, when the light source LS is turned on, and image reading is performed, as shown in the middle section (2) of FIG. 7E, the digital data in the non-document-placed region NDR has output values corresponding to the white color, while the digital data in the other region has output values corresponding to the background color. Further, as shown in the middle section (2) of FIG. 8E, the gradation values in the non-document-placed region NDR are as high as the maximum value representing the white color, while the gradation values in the other region are as high as the value representing the background color. When the light source LS is turned off, and image reading is performed, as shown in the rightmost section (3) of FIG. 7E, the digital data is as low as the dark output level. Further, as shown in the rightmost section (3) of FIG. 8E, the gradation values are as low as the minimum value representing the black color.

In the illustrative embodiment, in the step TA11 for determining whether the document cover CV is in the closed state, of the document size determining process (T9), the controller CR determines whether every piece of digital data of the specific pixels in the non-document-placed region NDR of the turn-off line is equal to or lower than the cover criterion value THco. As shown in the rightmost section (3) of FIG. 7E, in the state where the document cover CV is closed with the document placed on the transparent plate TP, the digital data in the non-document-placed region NDR is lower than the cover criterion value THco. By using the digital data, it is possible to detect the closed state of the document cover CV.

Advantageous Effects of Illustrative Embodiment

In the illustrative embodiment, in the document size determining process (T9), the determination in TA5 is repeatedly made until the predetermined period of time has elapsed (TA6: No). In TA5, the controller CR determines whether every piece of digital data of the specific pixels in the non-document-placed region NDR of the turn-off line is equal to or lower than the cover criterion value THco. Hence, by repeatedly making the determination in TA5, it is possible to detect the open/closed state of the document cover CV even when the predetermined period of time has not elapsed, and to quickly detect a change in the state of the document cover CV. Consequently, it is possible to generate, as the acquisition timing, a point of time immediately before the document cover CV is brought into the closed state.

In the illustrative embodiment, after changing the reading position to the A4-landscape position LP in T6 of the power-on process (M1), the controller CR determines whether every piece of digital data of the specific pixels in the non-document-placed region NDR of the turn-off line is equal to or lower than the cover criterion value THco, in TA5 of the document size determining process (T9). Thus, since the reading position is sufficiently away from the end portion of the transparent plate TP in the sub scanning direction, ambient light is hardly affected by the main body MB, but is blocked by the document cover CV. Consequently, it is possible to accurately detect the open/closed state of the document cover CV.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modification]

(1) The reading mechanism RM may be configured without the CIS. For instance, the reading mechanism RM may include a charge coupled device (hereinafter referred to as a "CCD") fixedly disposed and a movable mirror. In this case, the reading position is not a position of the CCD but a position of the mirror.

(2) In the aforementioned illustrative embodiment, the controller CR determines the state of the document cover CV, using the digital data in the A4-landscape position LP (TA5: Yes). Nonetheless, the controller CR may determine the state of the document cover CV using digital data in any position where the reading unit RU is allowed to detect ambient light.

(3) In the aforementioned illustrative embodiment, the controller CR determines the state of the document cover CV, using the digital data (TA5: Yes). Nonetheless, the controller CR may determine the state of the document cover CV, using the gradation values, instead of the digital data.

(4) In the aforementioned illustrative embodiment, the controller CR determines the document size, using the gradation values (TA10). Nonetheless, the controller CR may determine the document size, using the digital data, instead of the gradation values.

(5) In the aforementioned illustrative embodiment, after determining the state of the document cover CV (TA5: Yes), the controller CR determines the document size (TA10). Nonetheless, the controller CR may perform an initialization process for the reading process, after detecting the state of the document cover CV.

(6) In the aforementioned illustrative embodiment, the controller CR determines the state of the document cover CV, using the digital data in the non-document-placed region NDR (TA5: Yes). Nonetheless, the controller CR may determine the state of the document cover CV, using digital data in any region where the document is not placed, instead of the digital data in the non-document-placed region NDR.

(7) In the aforementioned illustrative embodiment, the cover criterion value THco is derived from multiplying by 1.1 the black data maximum value BKmax that is the maximum value in the non-document-placed region NDR among the black data BK. Nonetheless, the cover criterion value THco may be determined as a maximum value among all pieces of the black data BK. Alternatively, the cover criterion value THco may be determined based on the black data BK and the white data WT.

What is claimed is:

1. An image reader comprising:
    a document table configured to support a document placed thereon, the document table having:
        a reference point on which a vertex of the document is positioned;
        a first region within which the document is placed, the first region including a margin region, the margin region being defined as a range within a predetermined distance from a reference line in a main scanning direction, the reference line including the reference point and being parallel to a sub scanning direction perpendicular to the main scanning direction; and
        a second region positionally different from the first region in the main scanning direction;
    a document cover movable between an open state and a closed state, the document cover being configured to cover an upper surface of the document table when the document cover is in the closed state;
    a reading unit comprising a light source configured to emit light toward the document placed on the document table, the reading unit being configured to perform image reading on a line-by-line basis along the main scanning direction, and output analog data as read data;
    a converter configured to convert the analog data output from the reading unit into digital data;
    a moving mechanism configured to change a reading position where the reading unit performs image reading, in the sub scanning direction by moving the reading unit along the sub scanning direction; and
    a controller configured to:
        control the moving mechanism to change the reading position to a particular position in the sub scanning direction, the particular position being such a position that a distance thereto from the reference point in the sub scanning direction is equal to a length of a predetermined sheet size in the sub scanning direction;
        acquire specific digital data of the second region through image reading in the particular position with the light source turned off;
        determine whether the specific digital data of the second region is equal to or less than a first criterion value; and
        when determining that the specific digital data of the second region is equal to or less than the first criterion value, determine that the document cover is in the closed state or a state immediately before brought into the closed state;
        when determining that the specific digital data of the second region is more than the first criterion value, determine that the document cover is in the open state;
        acquire first digital data of the margin region through image reading in the particular position with the light source turned off when the document cover is open;
        acquire second digital data of the margin region through image reading in the particular position with the light source turned on when the document cover is open;
        determine whether a difference between the first digital data and the second digital data is more than a second criterion value;
        when determining that the difference between the first digital data and the second digital data is more than the second criterion value, determine that the document exists in the margin region on the document table; and
        when determining that the difference between the first digital data and the second digital data is equal to or less than the second criterion value, determine that the document does not exist in the margin region on the document table.

2. The image reader according to claim 1,
    wherein the controller is further configured to, when determining that the document exists in the margin region on the document table, perform a document size determining process comprising:
        acquiring fourth digital data of the second region through image reading in the particular position with the light source turned off when the document cover is open;
        acquiring fifth digital data of the second region through image reading in the particular position with the light source turned on when the document cover is open;
        determining whether a difference between the fourth digital data and the fifth digital data is more than the second criterion value;
        when determining that the difference between the fourth digital data and the fifth digital data is more than the second criterion value, determining that the document has a maximum size settable on the document table; and
        when determining that the difference between the fourth digital data and the fifth digital data is equal to or less than the second criterion value, determining that the document does not have the maximum size.

3. The image reader according to claim 2,
    wherein the controller is further configured to, when determining that the document does not have the maximum size, perform:
        acquiring line data of a single line along the main scanning direction through image reading in the particular position with the light source turned on when the document cover is in the state immediately before brought into the closed state;
        acquiring a value of the margin region from the acquired line data;
        acquiring a value of the second region from the acquired line data;

determining a third criterion value based on the acquired value of the margin region and the acquired value of the second region; and determining a size of the document by comparing the line data with the third criterion value.

* * * * *